(12) United States Patent
Watanabe et al.

(10) Patent No.: US 7,917,513 B2
(45) Date of Patent: Mar. 29, 2011

(54) DUPLICATING DATABASE CONTENTS

(75) Inventors: Yuji Watanabe, Yokohana (JP); Takeo Yoshizawa, Kawasaki (JP); Masayuki Numao, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 12/187,656

(22) Filed: Aug. 7, 2008

(65) Prior Publication Data

US 2008/0301198 A1  Dec. 4, 2008

(51) Int. Cl.
*G06F 17/30* (2006.01)
*G06F 7/00* (2006.01)

(52) U.S. Cl. ......... 707/737; 707/610; 707/698; 707/812

(58) Field of Classification Search .................. None
See application file for complete search history.

(56) References Cited

U.S. PATENT DOCUMENTS

| | | | | |
|---|---|---|---|---|
| 5,974,574 A * | 10/1999 | Lennie et al. | ................... | 714/52 |
| 6,393,485 B1 * | 5/2002 | Chao et al. | .................... | 709/231 |
| 6,523,036 B1 * | 2/2003 | Hickman et al. | ............... | 707/704 |
| 6,658,423 B1 * | 12/2003 | Pugh et al. | ............................. | 1/1 |
| 6,938,157 B2 * | 8/2005 | Kaplan | ......................... | 713/176 |
| 7,634,657 B1 * | 12/2009 | Stringham | ..................... | 713/168 |
| 2003/0046286 A1 * | 3/2003 | Jacobs et al. | ....................... | 707/8 |
| 2003/0051102 A1 * | 3/2003 | Jacobs et al. | .................. | 711/145 |
| 2004/0143713 A1 * | 7/2004 | Niles et al. | ..................... | 711/162 |

* cited by examiner

*Primary Examiner* — Greta L Robinson
*Assistant Examiner* — James J Wilcox
(74) *Attorney, Agent, or Firm* — Michael J. Buchenhorner; Vazken Alexanian

(57) ABSTRACT

The invention provides data processing, data control and information methods and systems for efficiently duplicating contents of a database in the data control system. An example of a data processing system includes: a cache unit acquiring, from a data control system which categorizes a plurality of data elements into a plurality of clusters and stores the plurality of clusters; a group-of-clusters update information acquisition unit for acquiring from the data control system group-of-clusters update information with respect to a group of clusters consisting of two or more clusters; a group-of-clusters update information computation unit for computing group-of-clusters update information with respect to the group of clusters based on two or more pieces of cluster update information; and an update judging unit for judging that a cached data element belonging to the group of clusters is the most updated one.

15 Claims, 8 Drawing Sheets

DUPLICATING DATABASE CONTENTS

FIELD OF THE INVENTION

The present invention relates to a data processing system, a data control system, a data processing method, a data control method, a data processing program, a data control program, and an information system. More particularly, the present invention relates to a data processing system, a data control system, a data processing method, a data control method, a data processing program, a data control program, and an information system, where the data processing system efficiently duplicates contents of a database in the data control system.

BACKGROUND OF THE INVENTION

In an information system for performing a data processing by using data stored on a database, speeding up of the processing is realized through a parallel processing by a plurality of data processing systems. Each data processing system in this manner duplicates data on the database. Therefore, data can be accessed at a high speed, and concentration of accesses to the database can be avoided.

EPCglobal U.S., "The EPCglobal Network™," [online], EPCglobal U.S., [Searched on December 16, Hei. 16 (2004)], Internet
   <URL:http://www.epcglobalus.
   followed by: org/Network/Network.html>
provides, as an application example of the information example, EPC-IS (Electric Product Code-Information Services) which controls attribute data for each product by adding a wireless tag to the product or the like. Such an information system individually controls attribute data for each product, and hence it needs to control large amounts of data and requires a large-scale distributed system. In the EPC-IS, the attribute data for each product is controlled by a representation form called PML (Physical Markup Language) (Please refer to Christian Floerkemeier et al., "PML Core Specification 1.0," [online], Sep. 15, 2003, EPCglobal Inc., [Searched on December 16, Hei. 16 (2004)],
   <URL:http://www.epcglobalinc.
   followed by: org/standards_technology/Secure/
   followed by: v1.0/PML_Core_Specification_v1.0.pdf>).

The EPC-IS based attribute data control has a feature that there are many inquiries to the attribute data and an update is rarely made. Therefore, each data processing system can duplicate the attribute data on the database and efficiently process them as far as no update occurs.

Yair Amir and Ciprian Tutu, "From total order to database replication," in Proc. of ICDCS 2002, pp. 494-, 2002., Haifeng Yu and Amin Vahdat, "Minimal replication cost for availability," in Proc. of PODC 2002, pp. 98-107, 2002., Chi Zhang and Zheng Zhang, "Trading replication consistency for performance and availability: an adaptive approach," in Proc. of ICDCS 2003, pp. 687-695, 2003., and Khuzaima Daudjee and Kenneth Salem, "Lazy database replication with ordering guarantees," in Proc. of ICDE 2004, pp. 424-435, 2004., disclose update processing methods for storing update operations onto a database by arranging them in order, and applying these update operations to duplicated data. Xueyan Tang and Samuel T. Chanson, "Minimal cost replication of dynamic web contents under flat update delivery," in IEEE Trans. Parallel Distrib. Syst. 15(5): 431-439, 2004., Serge Abiteboul, Angela Bonifati, Gregory Cobena, Ioana Manolescu, and Tova Milo, "Dynamic xml documents with distribution and replication," in Proc. of SIGMOD Conference 2003, pp. 527-538, 2003., and Ugur Cetinternel, Peter J. Keleher, and Yanif Ahmad, "Exploiting precision vs. efficiency tradeoffs in symmetric replication environments," in Proc. of PODC 2002, p. 128, 2002., disclose, as other update processing methods, update processing methods for transmitting only update results to a database. Specifically, Xueyan Tang and Samuel T. Chanson, "Minimal cost replication of dynamic web contents under flat update delivery," in IEEE Trans. Parallel Distrib. Syst. 15(5): 431-439, 2004., and Serge Abiteboul, Angela Bonifati, Gregory Cobena, Ioana Manolescu, and Tova Milo, "Dynamic xml documents with distribution and replication," in Proc. of SIGMOD Conference 2003, pp. 527-538, 2003., disclose methods for performing distributed arrangement and generation of data in a case where documents are dynamically generated through the Internet. Ugur Cetinternel, Peter J. Keleher, and Yanif Ahmad, "Exploiting precision vs. efficiency tradeoffs in symmetric replication environments," in Proc. of PODC 2002, p. 128, 2002., discloses a method for selecting, in the case of partly duplicating distributed data, whether to make an update to be reflected or not to ensure predetermined accuracy.

The update process methods disclosed in Yair Amir and Ciprian Tutu, "From total order to database replication," in Proc. of ICDCS 2002, pp. 494-, 2002., Haifeng Yu and Amin Vahdat, "Minimal replication cost for availability," in Proc. of PODC 2002, pp. 98-107, 2002., Chi Zhang and Zheng Zhang, "Trading replication consistency for performance and availability: an adaptive approach," in Proc. of ICDCS 2003, pp. 687-695, 2003., Khuzaima Daudjee and Kenneth Salem, "Lazy database replication with ordering guarantees," in Proc. of ICDE 2004, pp. 424-435, 2004., Xueyan Tang and Samuel T. Chanson, "Minimal cost replication of dynamic web contents under flat update delivery," in IEEE Trans. Parallel Distrib. Syst. 15(5): 431-439, 2004., Serge Abiteboul, Angela Bonifati, Gregory Cobena, Ioana Manolescu, and Tova Milo, "Dynamic xml documents with distribution and replication," in Proc. of SIGMOD Conference 2003, pp. 527-538, 2003., and Ugur Cetinternel, Peter J. Keleher, and Yanif Ahmad, "Exploiting precision vs. efficiency tradeoffs in symmetric replication environments," in Proc. of PODC 2002, p. 128, 2002., have a problem that a large amount of data needs to be sent in order and to transmit an update operation or an update result. In Yasushi Saito and Marc Shapiro, "Optimistic replication," in HP Technical report MSR-TR-2003-60, 2003., and Brent ByungHoon Kang, Robert Wilensky, and John Kubiatowicz, "Hash history approach for reconciling mutual inconsistency in optimistic replication," in Proc. of ICDCS '03, 2003., and Japanese Published Patent Application No. Hei 11 (1999)-306069, and Japanese Patent Translation Publication No. 2003-524243, update detection is performed cluster by cluster after clustering data elements on a database. Consequently, they also have a problem that an amount of communications between a database and a data processing system to check the update becomes large.

SUMMARY OF THE INVENTION

Consequently, the invention is to provide a data processing system, a data control system, a data processing method, a data control method, a data processing program, a data control program, and an information system, where the aforementioned problems can be solved.

A first aspect of the present invention provides an information system including: a data control system for categorizing a plurality of data elements to a plurality of clusters and storing the plurality of clusters; and a data processing system for acquiring data from the data control system and performing a data processing on the data. The invention additionally provides the data processing system, the data control system, a data processing method, a data control method, a data processing program, and a data control program all of which are concerned with the information system.

A data control system includes; a data storage unit for categorizing the plurality of data elements to the plurality of clusters and storing the plurality of clusters; a cluster update information storage unit for storing cluster update information indicative of an update state of a data element of each of the plurality of clusters in such a way that the cluster update information is associated with the each of the plurality of clusters; a cluster update information change unit for changing, to a different one, a data value in the cluster update information for the cluster to which the data element belongs, provided that the data element has been updated; a data transmission unit for transmitting to the data processing system the data element and the cluster update information for the cluster to which the data element belongs in response to a request from the data processing system; a first group-of-clusters update information computing unit for, in a condition where a referential request for the cluster update information with respect to a group of clusters consisting of the two or more clusters is received from the data processing system, computing group-of-clusters update information based on the cluster update information for the two or more clusters belonging to the group of clusters; and an update information transmission unit for transmitting the group-of-clusters update information to the data processing system.

A second aspect of the present invention provides an information system including a data control system for categorizing a plurality of data elements to a plurality of clusters and storing the plurality of clusters, and a data processing system for acquiring data from the data control system and performing a data processing on the data. The invention additionally provides the data processing system, the data control system, a data processing method, a data control method, a data processing program, and a data control program all of which are concerned with the information system.

BRIEF DESCRIPTION OF THE DRAWINGS

For a more complete understanding of the present invention and the advantage thereof, reference is now made to the following description taken in conjunction with the accompanying drawings, in which.

DESCRIPTION OF THE INVENTION

Figure 1:
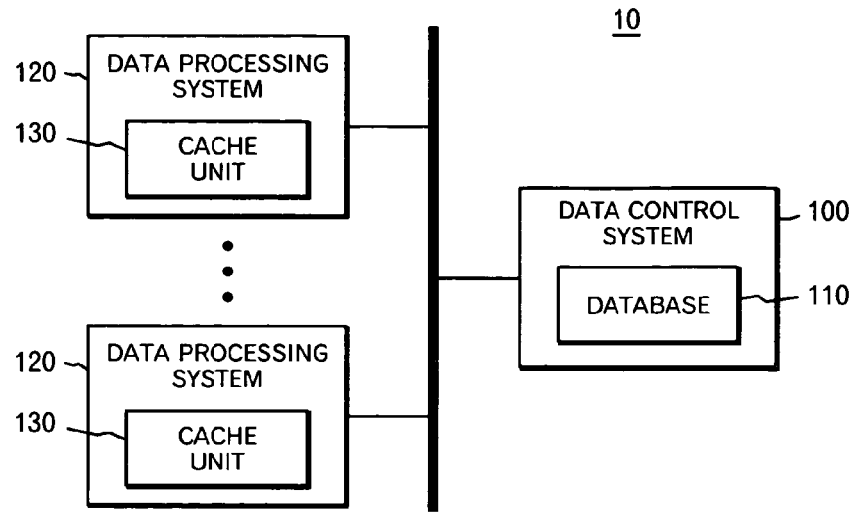
FIG. 1 shows a configuration of an information system 10 according to an embodiment of the present invention.

The present invention provides data processing systems, data control systems, data processing methods, data control methods, data processing programs, data control programs, and information systems which solve the before mentioned problems. A first embodiment of the present invention provides an information system including: a data control system for categorizing a plurality of data elements to a plurality of clusters and storing the plurality of clusters; and a data processing system for acquiring data from the data control system and performing a data processing on the data. The invention also provides the data processing system, the data control system, a data processing method, a data control method, a data processing program, and a data control program all of which are concerned with the information system.

An embodiment of a data control system includes; a data storage unit for categorizing the plurality of data elements to the plurality of clusters and storing the plurality of clusters; a cluster update information storage unit for storing cluster update information indicative of an update state of a data element of each of the plurality of clusters in such a way that the cluster update information is associated with the each of the plurality of clusters; a cluster update information change unit for changing, to a different one, a data value in the cluster update information for the cluster to which the data element belongs, provided that the data element has been updated; a data transmission unit for transmitting to the data processing system the data element and the cluster update information for the cluster to which the data element belongs in response to a request from the data processing system; a first group-of-clusters update information computing unit for, in a condition where a referential request for the cluster update information with respect to a group of clusters consisting of the two or more clusters is received from the data processing system, computing group-of-clusters update information based on the cluster update information for the two or more clusters belonging to the group of clusters; and an update information transmission unit for transmitting the group-of-clusters update information to the data processing system. The data processing system includes: a cache unit for acquiring from the data control system a data element belonging to a single cluster of the plurality of clusters and the cluster update information for the single clusters, and for caching the data element and the cluster update information thus acquired; group-of-clusters update information acquiring unit for transmitting to the data control system the referential request with respect to a group of clusters consisting of two or more of the clusters containing two or more of the cached data elements, and for acquiring the group-of-clusters update information for the group of clusters from the data control system; a second group of clusters update information computing unit for computing the group of clusters update information for the group-of-clusters based on two or more of the cached cluster update information; and a update judging unit for judging the cached data element belonging to the cluster of the group of clusters.

An embodiment of the present invention provides an information system including a data control system for categorizing a plurality of data elements to a plurality of clusters and storing the plurality of clusters, and a data processing system for acquiring data from the data control system and performing a data processing on the data. The second aspect additionally provides the data processing system, the data control system, a data processing method, a data control method, a data processing program, and a data control program all of which are concerned with the information system.

A data control system includes: a data storage unit for categorizing a plurality of data elements into a plurality of clusters and storing the plurality of clusters; a cluster update information storage unit for storing cluster update information indicative of an update state of a data element of each of the plurality of clusters in such a way the cluster update information is associated with the each of the plurality of clusters; a cluster update information change unit for changing, to a different one, a data value in the cluster update information for the cluster to which the data element belongs, provided that the data element has been updated; a data transmission unit for transmitting to the data processing system the data element and the cluster update information for the cluster to which the data element belongs in response to a request from the data processing system; a group-of-clusters update information receiving unit for receiving group-of-clusters update information computed by the data processing system based on the cluster update information with respect to a group of clusters consisting of two or more of the clusters, the cluster update information belonging to the group of clusters; a first group-of clusters update information computation unit for computing the group-of-clusters update information based on the cluster update information stored in the cluster update information storage unit with respect to the two or more clusters; and an update informing unit for informing that an aforementioned data element in an aforementioned cluster belonging to the group of clusters is the most updated one, the data element having been cached in the data processing system, in a condition where the group-of-clusters update information computed by the first group-of-clusters update information computing unit coincides with the group-of-clusters update information received from the data processing system.

A data processing system includes: a cache unit for acquiring from the data control system a data element belonging to a single cluster of the plurality of clusters, and the cluster update information for the single cluster, and for caching the data element and the cluster information thus acquired; a second group-of-clusters update information computation unit for computing group-of-clusters update information with respect to a group of clusters based on two or more pieces of the cluster update information acquired pertaining to two or more of the clusters containing two or more of the data elements having been cached, the group of clusters consisting of the two or more clusters; an update inquiry unit for transmitting to the data control system the group-of-clusters update information computed by the second group-of-clusters update information computation unit, and for inquiring whether or not the group-of-clusters update information thus transmitted coincides with the group-of-clusters update information which is set based on two or more of the cluster update information stored in the data control system with respect to the two or more clusters; and an update judging unit for judging that an aforementioned data element thus cached belonging to an aforementioned cluster of the group of the clusters is the most updated one, in a condition where a response is received that the group-of-clusters update information which is computed by the second group-of-clusters update information computation unit coincides with the group-of-clusters update information which is based on the cluster update information stored in the data control system.

Note that the aforementioned general description of the invention does not list all of the characteristics of the invention, and a sub-combination combining any of these groups of characteristics can be the present invention.

The followings are descriptions of the invention using example embodiments. However, the following embodiments do not restrict the invention determined by the scope of the claims, and it is not necessarily the case that all of combinations of characteristics described in the embodiment are essential in solving means of the invention.

FIG. 1 shows a configuration of an information system 10 of the embodiment. The information system 10 includes a data control system 100 and one or a plurality of data processing systems 120. The data control system 100 categorizes a plurality of data elements into a plurality of clusters and storing the plurality of clusters onto a database 110. That is, for example, the database 110 may store a plurality of lines and/or a plurality of attributes as a cluster by deeming each line and/or each attribute of the database as a data element. The database 110 may also store a plurality of data elements therein by allocating them among clusters divided in arbitrary forms.

Additionally, the database 110 stores cluster update information indicative of an update state of a data element belonging to each cluster, in such a way that the cluster update information is associated with the each cluster. This cluster update information indicates an update state of a data element of the cluster by changing a data value when at least any one of the data elements belonging to the cluster is updated.

Moreover, when group-of-clusters update information for a groups of clusters consisting of two or more clusters is requested, the database 110 generates group-of-clusters update information based on the cluster update information on the clusters, and transmits the information thus generated to the data processing system 120 as a requesting source.

The data processing system 120 acquires a data element from the data control system 100, caches the data element along with cluster update information for the data element in a cache 130, and performs a data processing by using the cached data. When the data processing system 120 according to the present invention tries to determine whether or not a cached data element is the most updated one, it operates as follows. First, it acquires group-of-clusters information for two or more clusters including the cached data element, from the database 100. Next, in a condition where the acquired group-of-clusters update information coincides with the group-of-clusters update information which is based on the cached cluster update information, the data processing system 120 judges that the cached data element belonging to the clusters is the most updated one.

According to the aforementioned information system 10, the data processing system 120 is allowed to detect presence of an update with respect to a plurality of clusters by acquiring one piece of group-of-clusters update information. The data processing system 120 sequentially detects updates for a plurality of groups of clusters according to need, permitting efficient detection of an update of an data element on the database 110 with a small amount of communications.

Figure 2:
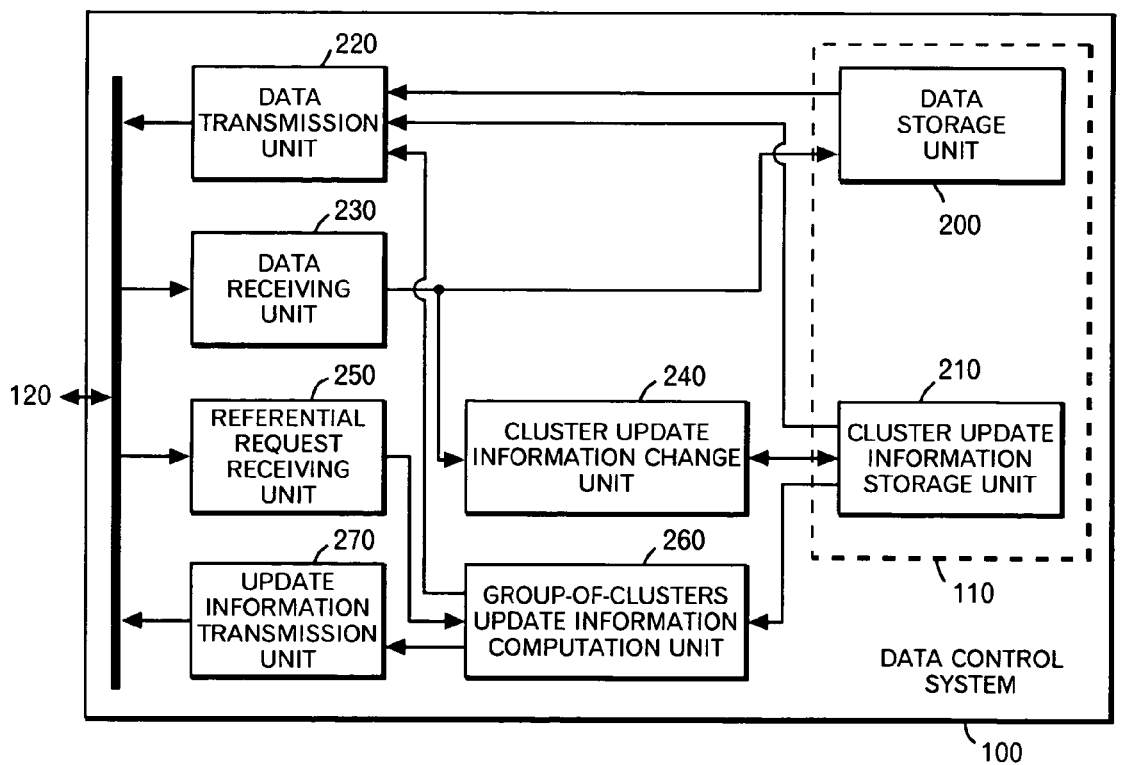
FIG. 2 shows a configuration of a data control system 100 according to the embodiment of the present invention.

FIG. 2 shows a configuration of a data control system 100 according to the embodiment of the present invention. The data control system 100 includes a database 100, a data transmission unit 220, a data receiving unit 230, a cluster update information change unit 240, a referential request receiving unit 250, a group-of-clusters update information computation unit 260, and an update information transmission unit 270.

The database 110 includes a data storage unit 200 and a cluster update information storage unit 210. The data storage unit 200 categorizes a plurality of data elements into a plurality of clusters and store the plurality of clusters. The data storage unit 200 according to this embodiment, for example, store attribute data such as a product name and a price of each product in such a way that the data are associated with an ID of the product written on a wireless tag added to the product. The cluster update information storage unit 210 stores cluster update information showing an update state of a data element belonging to each of the clusters, in such a way that the cluster update information is associated with the information to the each of the clusters. The data transmission unit 220, on receipt of a read-out request for a data element from the data processing system 120, transmits the data element and cluster update information for the cluster to which the data element belongs, to the data processing system 120 as a requesting source. The data receiving unit 230 receives a write-in request for a data element from the data processing system 120, and updates the database 110 by writing the received data element in the data storage unit 200.

A cluster update information change unit 240 changes, to a different data value, cluster update information for the cluster to which the data element belongs, provided that the data element has been updated in response to a write-in request of the data processing system 120. The cluster update information change unit 240 according to this embodiment, for example, changes the cluster update information for the cluster into a different data value obtained by converting an original data value through a hash function.

An inquiry request receiving unit 250 receives an inquiry request for cluster update information with respect to a group of clusters consisting of two or more clusters. A group-of-clusters update information computation unit 260, on receipt of an inquiry request of cluster update information for a group of clusters consisting of two or more clusters from the data processing system 120, reads out cluster update information for two or more clusters belonging to the group of clusters from the cluster update information storage unit 210, and computes group-of-clusters update information which is based on these pieces of cluster update information.

A group-of-clusters update information computation unit 260 according to this embodiment, for example, performs exclusive OR operations on cluster update information for all of the clusters belonging to the group of clusters for every corresponding bit thereto. Thus, the group-of-clusters update information computation unit 260 assumes a value obtained through the exclusive OR operations to be group-of-clusters update information for the group of clusters. An update information transmission unit 270 transmits the group-of-clusters update information computed by the group-of-clusters update information computation unit 260 to the data processing system 120, in response to a referential request from the data processing system 120.

The aforementioned data control system 100, on receipt of a referential request for cluster update information for a group of clusters consisting of two or more clusters, allows the group-of-clusters update information computation unit 260 to compute group-of-clusters update information which is based on cluster update information for the clusters. Thereby, an amount of data of update information to be transmitted to the data processing system 120 can be reduced, in comparison with a case that all of the cluster update information are transmitted to the data processing system 120.

Figure 3:
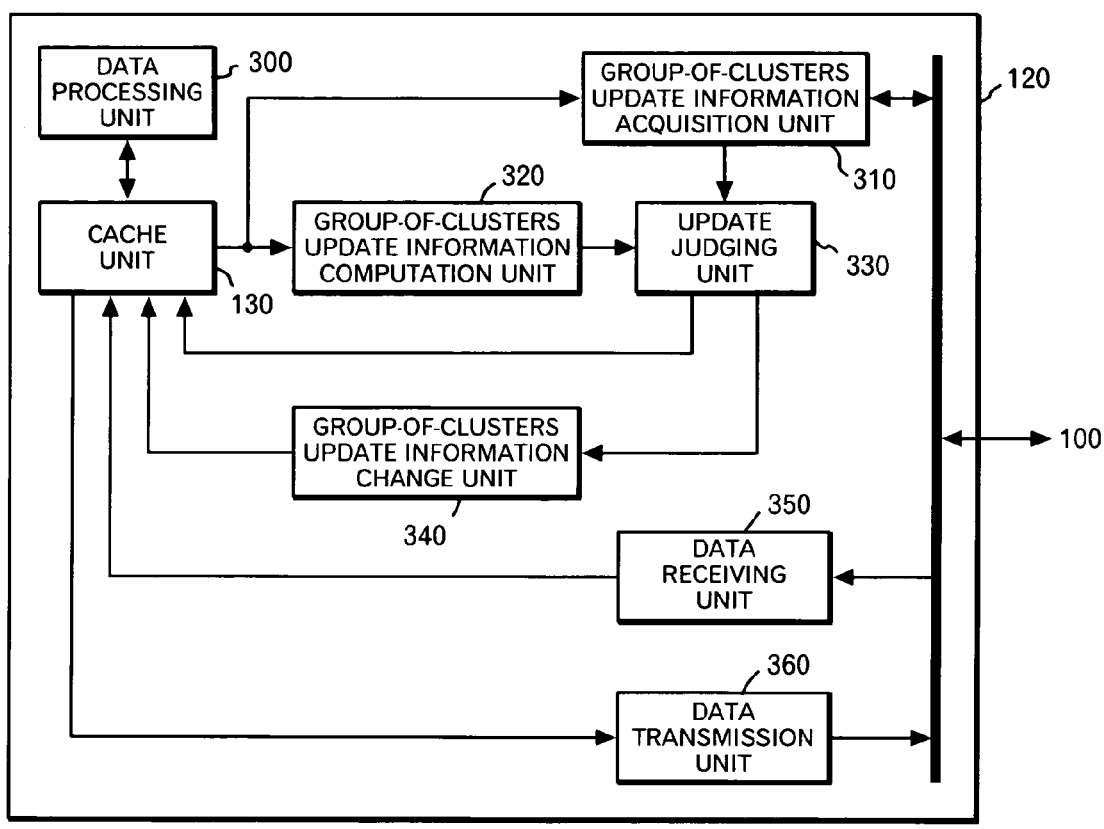
FIG. 3 shows a configuration of a data processing system 120 according to the embodiment of the present invention.

FIG. 3 shows a configuration of a data processing system 120 according to this embodiment. The data processing system 120 includes a data processing unit 300, a cache unit 130, a group-of-clusters update information acquisition unit 310, a group-of-clusters update information computation unit 320, an update judging unit 330, a group-of-clusters update information change unit 340, a data receiving unit 350, and a data transmission unit 360.

The database processing unit 300 accesses to a data element stored on the database 110 according to need and performs a data processing. For example, the data processing unit 300 may be a Web application server, and it may process Web applications such as wireless tag attribute data control while referring to the database 110 in response to a request from a terminal.

The data cache 130, in response to an access of the data processing unit 300 to an data element belonging to a cluster, acquires the data element and cluster update information for the cluster from the data control system 100 through the data receiving unit 350. Then, the cache unit 130 caches the data element and the cluster update information. Thereby, with respect to an data element which has already been cached, the data processing unit 300 can acquire the data element from the cache unit 130 instead of the database 110.

The group-of-clusters update information acquisition unit 310 acquires group-of-clusters update information for a group of clusters consisting of at least one cluster from the data control system 100, in a case where it detects whether or not the cached data element has been updated in the data control system 100. More specifically, in a case where two or more data elements belonging to different clusters have been cached, the group-of-clusters update information acquisition unit 310 transmits to the data control system 100 a referential request for cluster update information for a group of clusters consisting of two or more clusters to which the two or more cached data elements belong. The data control system 100, on receipt of the referential request, computes group-of-clusters update information based on two or more pieces of cluster update information stored on the database 110, each of the pieces corresponding to the two or more clusters belonging to the group of clusters.

The group-of-clusters update information computation unit 320 computes group-of-clusters update information for a group of clusters which is a subject of a referential request, based on one or more than two pieces of cluster update information cached in the cache unit 130. In a condition where the group-of-clusters update information computed from the group-of-clusters update information computation unit 320 coincides with the group-of-clusters update information acquired from the data control system 100, the update judgment 330 judges that a cached data element belonging to a cluster in the group of clusters is the most updated. The data processing unit 300 can process data by using the most updated data element, in response to this judgment.

On the other hand, in a condition where the group-of-clusters update information computed by the group-of-clusters update information computation unit 320 does not coincide with the group-of-clusters update information acquired from the data control system 100, the update judgment 330 judges that a cached data element belonging to a cluster in the group of clusters is not the most updated. Then, the data processing system 120 performs an update checks on each of the cached data elements belonging to the cluster, and acquires updated data elements from the data control system 100 again. In this case, it is also possible that the update judgment unit 330 transmits a read-out request for an updated data element to the data control system 100, allows the data receiving unit 350 to receive the most updated data element, and makes the old data element in the cache unit 130 to be replaced with its most updated data value. Alternatively, the update judgment unit 330 may make the old data element invalid to prohibit the data processing unit 300 from using it.

The group-of-clusters update information change unit 340, based on one piece or plural pieces of group-of-clusters update information and/or cluster update information acquired from the data control system 100 through the group-of-clusters update information acquisition unit 310, changes group-of-clusters update information and/or cluster update information cached in the cache 130 to the most updated value. Provided that a data element to be used by the data processing unit 300 has not been cached in the cache unit 130, the data receiving unit 350 receives from the data control system 100 the data element and cluster update information for a cluster to which the data element belongs, and store them into the cache unit 130. Provided that a data element in the cache unit 130 has been updated by the data processing unit 300, the data transmission unit 360 transmits the data element to the data control system 100. In response to this, the data control system 100 updates the data element on the database 110.

The aforementioned data processing system 120 compares group-of-clusters update information which is based on cluster update information stored in the data control system 100, with group-of-clusters update information which is based on cluster update information stored in the cache unit 130. Thereby, the data processing system 120 enables itself to determine whether or not a cached data element is the most updated. For this reason, the data control system 100 does not need to store which data element is cached by the data processing system 120. When a large number of data processing systems 120 are connected to the data control system 100, a cost for controlling a caching state in the data control system 100 can be reduced.

Figure 4:
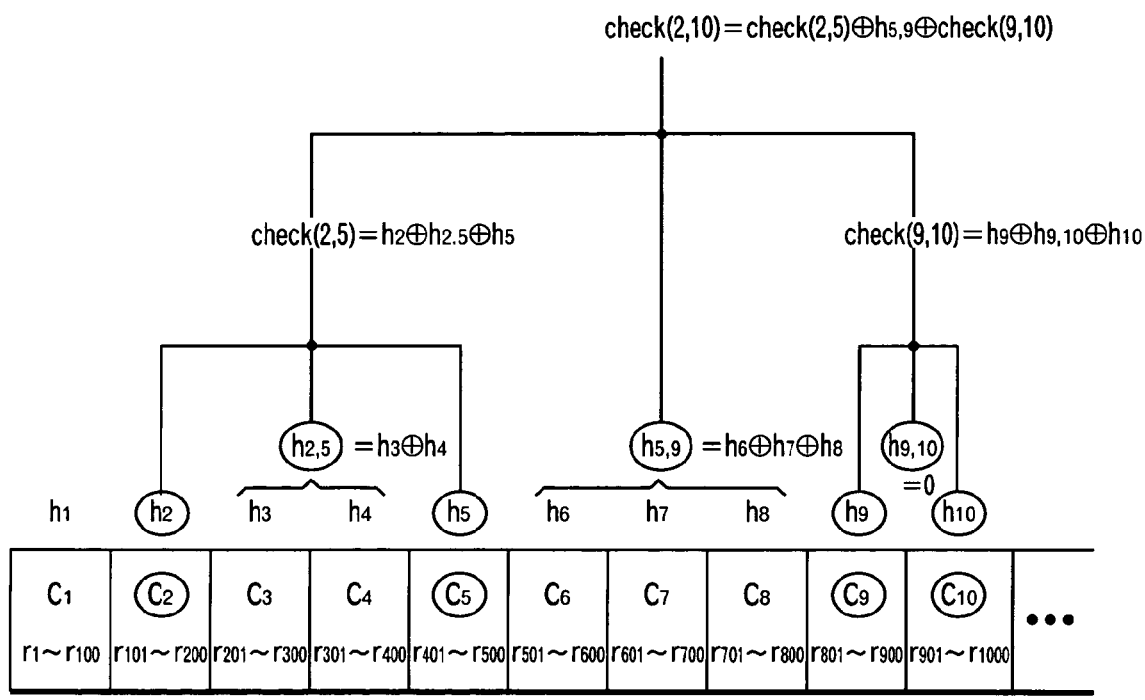
FIG. 4 shows an example of group-of-clusters update information according to the embodiment of the present invention.

FIG. 4 shows an example of group-of-clusters update information according to this embodiment. The following describes a control method of cluster update information, a cache method, an update check method, and an update method of cached group-of-clusters update information, in the information system 10.

(1) A Control Method of Cluster Update Information:

The data storage unit 200 stores a plurality of data elements $\{r_1, \ldots, r_n\}$ (=a set R) after clustering them in advance into a plurality of clusters $C_1$ to $C_t$. To each cluster $C_i$, cluster number $c_i$ is allocated. In this embodiment, the total number t of the clusters is made to be sufficiently small as compared to the total number n of all the data elements (t<<n), and any same data element is made to belong to one cluster (i≠j ⇒$C_i \cap C_j = \Phi$).

The cluster update information storage unit 210 stores, for every cluster, cluster update information $h_i$ used as an update checksum indicating that at least one data element $x_a$ belonging to the cluster $C_i$ is updated. The cluster update information storage unit 210 applies an initial value of the cluster update information $h_i$ to H(i☐☐0) by using a predetermined hash function H( ). When at least one of the data elements in cluster $C_i$ is updated, the cluster update information change unit 240 converts the cluster update information $h_i$ into a new update information $h'_i$=H(i☐☐$h_i$) by the hush function H.

(2) A Cache Method:

A cache method will be described for a case where a data processing system 120 duplicates a total number k of data elements $\{x_1, \ldots, x_k\}$ (=a set X⊂R) from the database 110 and cache them. The total number k of the cached data elements is sufficiently small as compared to the total number n of all the data elements. The data transmission unit 220 in the data control system 100 transmits to the data processing system 120 a list $L_1$ of data elements x to be duplicated and identifiers $c_i$ of clusters to which the data elements x belong, and also, for all of clusters to which the data elements to be duplicated belong, transmits thereto a list $L_2$ of identifiers $c_i$ of the aforementioned clusters $C_i$ and cluster update information $h_i$ of the clusters $C_i$. Additionally, in this embodiment, the data transmission unit 220 causes the group-of-clusters information computation unit 260 to compute group-of-clusters update information $h_{i,j}$ in such a way that the information $h_{i,j}$ is associated with an identifier $c_i$ of the cluster $C_i$, the group-of-clusters update information $h_{i,j}$ being intended to be stored by the data processing system 120. Then, the data transmission unit 220 makes the information $h_{i,j}$ to be included in the list $L_2$, and transmits the List $L_2$ to the data processing system 120. The group-of-clusters update information $h_{i,j}$ is computed based on cluster update information $h_{i+1}$ to $h_{j-1}$ of each of clusters which are from cluster $C_{i+1}$ next to the cluster $C_i$ to cluster $C_{j-1}$ immediately preceding cluster $C_j$ which is next to the cluster $C_i$ among clusters to which data elements to be cashed belong. More specifically, the group-of-clusters update information $h_{i,j}$ is computed by exclusive OR operations on cluster update information $h_{i+1}$ to $h_{j-1}$.

FIG. 4 shows an example of a data processing system 120 where it caches at least one data element belonging to each of clusters $C_2$, $C_5$, $C_9$, and $C_{10}$. The data control system 100, in response to a read-out request, transmits a set of an identifier $c_2$, cluster update information $h_2$, and group-of-clusters update information $h_{2,5}$ (=$h_3$ xor $h_4$) for a group of clusters from cluster $C_3$ next to the cluster $C_2$ to cluster $C_4$ immediately preceding cluster $C_5$ which is next to the cluster $C_2$ among the clusters to which data elements to be cached belong, and transmits the set of them to the data processing system 120. Similarly to the data processing system 120, the data control system 100 transmits a set of an identifier $c_5$, cluster update information $h_5$, and group-of-clusters update information $h_{5,9}$ (=$h_6$ xor $h_7$ xor $h_8$) for a group of clusters from clusters $C_6$ to $C_8$, a set of an identifier $c_9$, cluster update information $h_9$, and group-of-clusters update information $h_{9,10}$ (=0), and a set of an identifier $c_{10}$, cluster update information $h_{10}$, and group-of-clusters update information 0.

The data processing system 120 receives the aforementioned sets of cluster update information and group-of-clusters update information. Thereby, the data processing system 120 can cache cluster update information for all of the clusters to which cached data elements belong (for example, $h_2$, $h_5$, $h_9$, and $h_{10}$) in the cache unit 130. Also, the data processing system 120 can cache, in the cache unit 130, group-of-clusters update information for all of the groups of clusters to which no cached data elements belong (for example, $h_{2,5}$ and $h_{5,9}$), the group consisting of one or more clusters arrayed between each two adjacent ones of the clusters to which the cached data elements belong.

Note that, when each data processing system 120 can specify a cluster to which each data element belongs, the data control system 100 does not need to transmit a cluster identifier in association with each data element.

(3) A Update Check Method:

(3-1) Update Check for a Group of Clusters:

The data processing unit 120 caches a set of the cluster update information and the group-of-clusters update information shown in the above description (2). Thereby, the data processing unit 120 can compute group-of-clusters update information with respect to a group of clusters within a range determined by any two clusters to which cached data elements belong, as in the following manner.

Specifically, the data processing unit 120 can compute group-of-clusters update information with respect to a group of clusters within a range determined by two adjacent ones of clusters to which cached data elements belong, based on: cluster update information for the adjacent two clusters among the clusters to which cached data elements belong; and group-of-clusters update information for one or more clusters to which the cached data elements do not belong, the one or more clusters being arrayed between these two adjacent clusters. For example, in a case where the cache unit 130 is assumed to cache data elements only of clusters $C_2$ and $C_5$ in a group of clusters $\{C_2, \ldots, C_5\}$, the cache unit 130 caches each of the following information as group-of-clusters update information: cluster update information $h_2$ for the cluster $C_2$, cluster update information $h_5$ for the cluster $C_5$, group-of-clusters update information $h_{2,5}$ which is based on cluster update information $h_3$ and $h_4$ for all of the other clusters $\{C_3, C_4\}$ among the group of clusters $\{C_2, \ldots, C_5\}$. Therefore, the data processing unit 120 can compute group-of-clusters update information check(2,5) for group-of-clusters $\{C_2, \ldots, C_5\}$ by performing exclusive OR operations on cluster update information $h_2$, cluster update information $h_5$ and group-of-clusters update information $h_{2,5}$, for every bit corresponding thereto. The reason for this is that since an exclusive OR operation satisfies the associative law, check(2, 5)=$h_2$ xor $h_3$ xor $h_4$ xor $h_5$=$h_2$ xor ($h_3$ xor $h_4$) xor $h_5$=$h_2$ xor $h_{2,5}$ xor $h_5$.

Similarly, the data processing system 120 can compute group-of-clusters update information for a group of clusters consisting of a plurality of groups of clusters, based on group-of-clusters update information for each of the groups of clusters. For example, the cache unit 130 is assumed to have acquired from the data control system 100, and to have cached, group-of-clusters update information $h_{5,9}$ for a group of clusters $\{C_6, \ldots, C_8\}$, which belong to a group of clusters $\{C_2, \ldots, C_{10}\}$ and include all of the clusters not belonging to any one of groups of clusters $\{C_2, \ldots, C_5\}$ and $\{C_9, \ldots, C_{10}\}$, and whose data elements belonging to any one of the clusters $\{C_6, \ldots, C_8\}$ are not cashed. Therefore, the data processing system 120 can compute group-of-clusters update information check(2,10) for a group of clusters $\{C_2, \ldots, C_{10}\}$, based on: group-of-clusters update information check(2,5) and check(9,10) for groups of clusters $\{C_2, \ldots, C_5\}$ and $\{C_9, \ldots, C_{10}\}$ having clusters to which cached data elements belong; and group-of-clusters update information $h_{5,9}$ for a group of clusters $\{C_6, \ldots, C_8\}$ having clusters to which cached data elements do not belong. More specifically, the data processing system 120 performs exclusive OR operations on group-of-clusters update information check(2,5) and check(9,10), and group-of-clusters update information $h_{5,9}$, for every bit corresponding thereto. Group-of-clusters update information check(2,10) can thus be computed for a group of clusters $\{C_2, \ldots, C_{10}\}$ having these groups of clusters.

On the other hand, the data control system 100 can compute group-of-clusters update information for a group of clusters within a region determined by any two clusters, based on cluster update information stored on the database 110 for all of the clusters in the groups of clusters. Namely, for example, the data control system 100 can compute group-of-clusters update information check(2,10) for a group of clusters $\{C_2, \ldots, C_{10}\}$ by performing exclusive OR operations on cluster update information $h_2, \ldots, h_{10}$ stored on the database 110 for every bit corresponding thereto.

The data processing system 120 computes group-of-clusters update information for a group of clusters containing clusters to which cached data elements belong, based on cluster update information and/or group-of-clusters update information stored in the cache unit 130. Also, the data processing system 120 transmits an referential request for cluster update information for the same group of clusters to the data control system 100, and acquires group-of-clusters update information for the same group of clusters. The data processing system 120 then compares the computed group-of-clusters update information with group-of-clusters update information acquired from the data control system 100. In a condition where the computed information is found to coincide with the acquired one by the comparison, the data processing system 120 can judge that a cached data element for the group of clusters is the most updated.

Note that, in the aforementioned processing, the data control system 100 can compute group-of-clusters update information for a group of clusters in response to a referential request from the data processing system 120. Therefore, the data control system 100 does not need to perform a cache control on data elements and/or clusters cached by the data processing system 120.

(3-2) Identification of Updated Clusters:

The data processing system 120 can detect presence of an update in a group of clusters containing all of the clusters to which cached data elements belong, by using the update check method for a group of clusters described in the above description (3-1). Additionally, when an update of any data element in a group of clusters is detected, the data processing system 120 checks a subgroup of clusters for presence of an update, the subgroup being subsets of the group of clusters, and thereby a range of updated clusters can be specified.

The data processing system 120 according to this embodiment searches an updated cluster by using a tree structure graph. In the tree structure graph, groups of clusters containing all of the clusters to which cached data elements belong are made to correspond a root node, a group of clusters included in groups of clusters designated by an upper node is made to correspond to a lower node, the group containing a cluster to which a cached data element belongs, and a cluster to which a cached data element belongs is made to correspond to an end node. This embodiment assumes the preconditions: that a group of clusters corresponding to each node includes one cluster, or two or more clusters whose cluster numbers are continuous; and that, in the group of cluster, at least one data element is cached among data elements belonging to a cluster allocated with the minimum cluster number, and at least one data element is cached among data elements belonging to a cluster allocated with the maximum cluster number. Alternatively, the group of clusters may adopt a condition where no data element is cached among the data elements belonging to either or both of clusters allocated with the minimum cluster number and the maximum cluster number.

The data processing system 120 conducts the following operations for a first group of clusters consisting of a first number t1 of clusters (e.g., $\{C_2, \ldots, C_{10}\}$) in a condition where first group-of-clusters update information (e.g., check (2,10)) computed by the group-of-clusters update information computation unit 260 does not coincide with first group-of-clusters update information acquired from the data control system 100.

(i) The data processing system 120 checks, for presence of an update, a second group of clusters (e.g., $\{C_2, \ldots, C_5\}$) corresponding to any one of nodes lower than a node corresponding to the first group of clusters.

Specifically, the group-of-clusters acquisition unit 310 acquires second group-of-clusters information (e.g., check(2, 5)) from the data control system 100, with respect to the second group of clusters belonging to the first group of clusters and consisting of a second number t2 of clusters, the second number being smaller than the first number. The second group-of-clusters information is based on cluster update information (e.g., $\{h_2, \ldots, h_5\}$) for the t2 clusters belonging to the second group of clusters.

Next, the group-of-clusters update information computation unit 260 computes the second group-of-clusters update information for the second group-of-clusters, based on t2 pieces of cached cluster update information. In this case, the group-of-clusters update information computation unit 260 may also compute group-of-clusters update information for a group of clusters corresponding to a node lower than the second group of clusters based on cached cluster update information. By using the resultant group-of-clusters update information, the unit 260 may compute the second group-of-clusters update information.

Then, in a condition where the second group-of-clusters update information computed by the group-of-clusters information computation unit 260 coincides with the second group-of-clusters update information acquired from the data control system 100, the update judgment unit 330 judges that a cached data element belonging to the second group of clusters is the most updated.

(ii) When it is judged that the second group of clusters has been updated, the data processing system 120 checks, for presence of an update, a third group of clusters corresponding to a node lower than the second group of clusters.

More specifically, in a condition where the second group-of-clusters update information computed by the group-of-clusters update information computation unit 260 does not coincide with the second group-of-clusters update information acquired from the data control system 100, the update judgment unit 330 judges that the second group of clusters has been updated. In this case, the group-of-clusters update information acquisition unit 310 acquires third group-of-clusters update information from the data control system 100, with respect to the third group of clusters belonging to the second group of clusters and consisting of a third number t3 of clusters, the number t3 being smaller than the second number t2. The third group-of-clusters update information is based on cluster update information for the t3 clusters belonging to the third group of clusters.

Next, the group-of-clusters update information computation unit 260 computes the third group-of-clusters update information for the third group-of-clusters, based on t3 pieces of cached cluster update information. In a condition where the third group-of-clusters update information computed by the group-of-clusters update information computation unit 260 coincides with the third group-of-clusters update information acquired from the data control system 100, the update judgment unit 330 judges that a cached data elements belonging to the clusters in the third group of clusters is the most updated.

(iii) When it is judged in the above description (i) that the second group of clusters has not been updated, the data processing system 120 checks a fourth group of clusters (e.g., $\{C_9, \ldots, C_{10}\}$) corresponding to a node lower than the node corresponding to the first group-of-clusters, for presence of an update.

Specifically, the group-of-clusters update information acquisition unit 310 acquires fourth group-of-clusters update information (e.g., check(9,10)) from the data control system 100, with respect to a fourth group of clusters consisting of a fourth number t4 of clusters which belong to the first group-of-clusters but do not belong to the second group of clusters. The fourth group-of-clusters update information is based on cluster update information for the t4 clusters belonging to the fourth group of clusters.

Next, the group-of-clusters update information computation unit 260 computes the fourth group-of-clusters information for the fourth group-of-clusters based on t4 pieces of cached cluster update information. In a condition where the fourth group-of-clusters update information computed by the group-of-clusters update information computation unit 260 coincides with the fourth group-of-clusters update information acquired from the data control system 100, the update judgment unit 330 judges that a cached data element belonging to a cluster of the fourth group of clusters is the most updated.

The data processing system 120 can specify an updated cluster by repeatedly conducting operations described in (i) to (iii) from groups of clusters corresponding to upper nodes to cluster corresponding to end nodes in the tree structure graph.

(3-3) Specification of an Updated Data Element:

By performing the above operations in (3-2), the data processing system 120 can specify a cluster having an updated data element. In response to this, the data processing system 120 performs an update check on each of the cached data elements belonging to the cluster, and acquires the updated data element from the data control system 100.

(4) Update of Cached Group-of-Clusters Update Information:

The update judgment unit 330 judges that a fifth group of clusters $\{C_6, \ldots, C_8\}$ consisting of all of the clusters belonging to the first group of clusters and not belonging to either the second group of clusters or the fourth group of clusters, in a condition where: the second group-of-clusters update information (e.g., check(2,5)) and the fourth group-of-clusters update information (e.g., check(9,10)) respectively computed by the group-of-clusters update computation unit 260 respectively coincide with the second group-of-clusters update information and the fourth group-of-clusters update information respectively acquired from the data control system 100, in a condition where the first group-of-clusters update information (e.g., check(2,10)) computed from the group-of-clusters update information computation unit 260 does not coincide with the first group-of-clusters update information acquired from the data control system 100. In this case, the update judgment unit 330 changes the fifth group-of-clusters update information $h_{5,9}$ based on the first group-of-clusters update information check(2,10), the second group-of-clusters update information check(2,5) and the fourth group-of-clusters update information check(9,10) respectively acquired from the data control system 100.

More specifically, the update judgment unit 330 finds a data value as a result of performing exclusive OR operations on the first group-of-clusters update information check(2,10), the second group-of-clusters update information check(2,5), and the fourth group-of-clusters update information check(9, 10) by every corresponding bit thereto. This data value is the fifth group-of-clusters update information $h_{5,9}$ as shown by the following equation.

$$\text{check}(2, 10) \; xor \; \text{check}(2, 5) \; xor \; \text{check}(9, 10) =$$
$$\begin{pmatrix} \text{check}(2, 5) \\ xor \; h_{5,9} \; xor \; \text{check}(9, 10) \end{pmatrix} xor \; \text{check}(2, 5) \; xor \; \text{check}(9, 10) =$$
$$\begin{pmatrix} \text{check}(2, 5) \\ xor \; \text{check}(2, 5) \end{pmatrix} xor \; h_{5,9} \; xor \begin{pmatrix} \text{check}(9, 10) \\ xor \; \text{check}(9, 10) \end{pmatrix} = h_{5,9}$$

By the aforementioned operations, the data processing system 120 can independently compute the group-of-clusters update information for the fifth group of clusters consisting of clusters other than those to which cached data elements belong, based on group-of-clusters update information for a group of clusters at an upper node and group-of-clusters update information for groups of clusters corresponding to lower nodes to which cached data elements belong.

Figure 5:
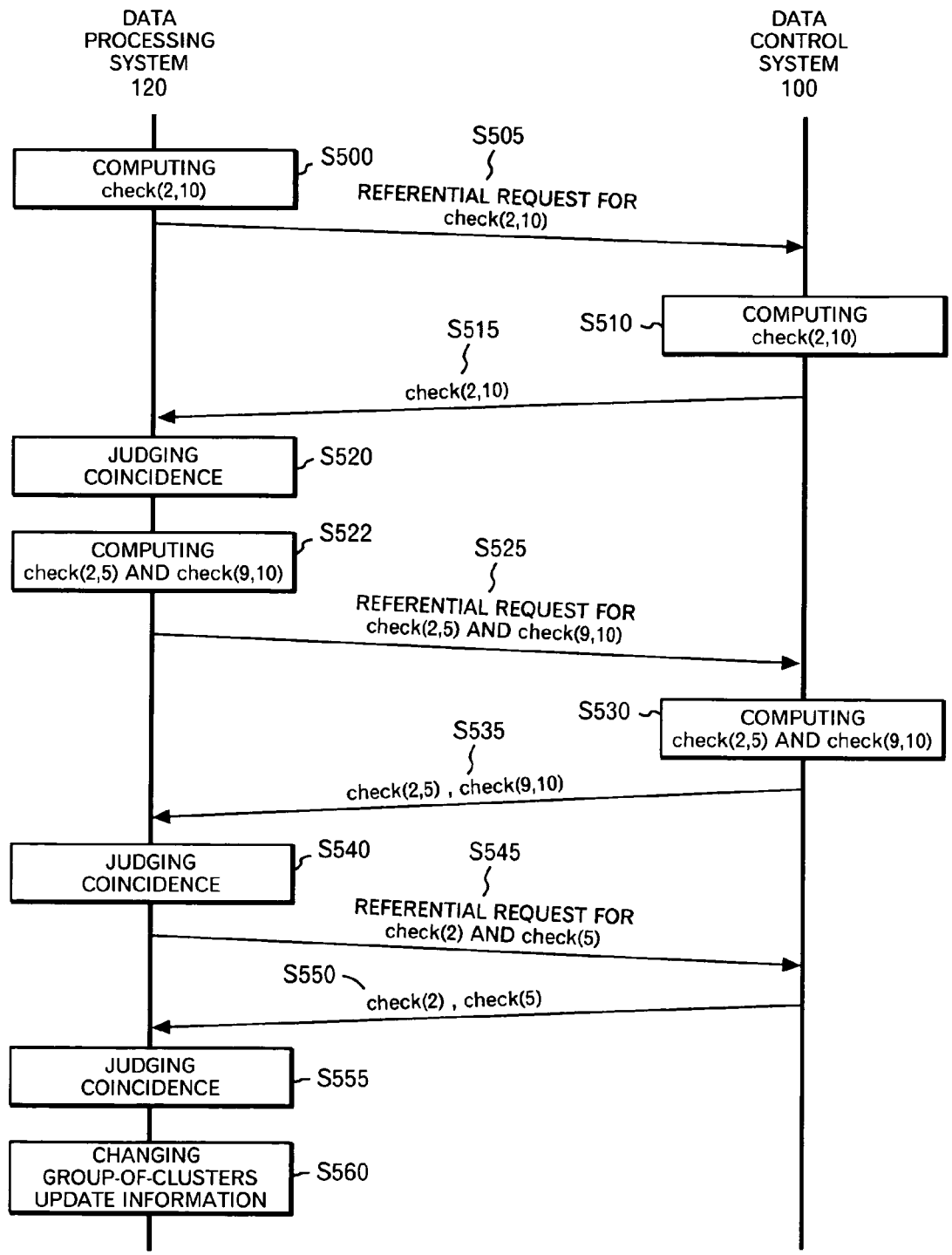
FIG. 5 shows a communication flow of an information system 10 according to the embodiment of the present invention.

FIG. 5 shows a communication flow for detecting an updated cluster based on the tree structure graph shown in FIG. 4, in the information system 10 according to this embodiment.

First, the group-of-clusters update information computation unit 320 in the data processing system 120 computes group-of-clusters update information check(2,10), based on cluster update information stored in the cache unit 130, for a group of clusters $\{C_2, \ldots, C_{10}\}$ containing all of the clusters to which cached data elements belong (a step S500). Next, the group-of-clusters update information acquisition unit 310 transmits to the data control system 100 a referential request for cluster update information with respect to the group of clusters (S505).

On receipt of the referential request for the cluster update information with respect to the group of clusters $\{C_2, \ldots, C_{10}\}$, the group-of-clusters update information computation unit 260 in the data control system 100 computes group-of-clusters update information check(2,10) for the group of clusters (S510), and returns the information to the data processing system 120 through the data transmission unit 220.

Next, the update judgment unit 330 determine whether or not group-of-clusters update information check(2,10) computed in S500 coincides with group-of-clusters update information check(2,10) acquired from the data control system 100 in S515 (S520). If it does, the update judgment 330 judges that any data elements cached with respect to the group of clusters are the most updated, and allows the data processing unit 300 to continue processing data.

On the other hand, if it does not in S520, the group-of-clusters update information computation unit 320 in the data processing system 120 computes group-of-clusters update information check(2,5) and check(9,10) respectively for groups of clusters $\{C_2, \ldots, C_5\}$ and $\{C_9, \ldots, C_{10}\}$ corresponding to nodes lower than group-of-clusters $\{C_2, \ldots, C_{10}\}$ (S522). Next, the group-of-clusters update information acquisition unit 310 transmits to the data control system 100 a referential request for cluster update information with respect to these groups of clusters (S525).

On receipt of the referential request in S525, the group-of-clusters update information computation unit 260 in the data control system 100 computes group-of-clusters update information check(2,5) and check(9,10) respectively for these groups of clusters (S530), and returns the information to the data processing system 120 through the data transmission unit 220 (S535).

Next, the update judgment unit 330 determines whether or not the group-of-clusters update information check(2,5) and check(9,10) computed in S522 coincides with the group-of-clusters update information check(2,10) and check(9,10) acquired from the data control system 100 in S535 (S540). If it does, the update judgment unit 330 judges that each of the cached data elements for these groups of clusters is the most updated, and update group-of-clusters update information $h_{5,9}$ for a group of clusters $\{C_6, \ldots, C_8\}$ consisting of clusters which belongs to a group of clusters $\{C_2, \ldots C_{10}\}$ corresponding to an upper node, and to neither of groups of clusters $\{C_2, \ldots, C_5\}$ and $\{C9, \ldots, C10\}$ corresponding to nodes lower than the upper node.

On the other hand, if it does not for the group-of-clusters update information check(2,5) in S540, the group-of-clusters update information acquisition unit 310 in the data processing system 120 transmit to the data control system 100 a referential request for cluster (group-of-clusters) update information with respect to clusters $C_2$ and $C_5$ corresponding to nodes further lower than the group of clusters $\{C_2, \ldots, C_5\}$ (S545). In response to this, the data transmission unit 220 in the data control system 100 returns to the data processing system 120 cluster update information $h_2$ and $h_5$ for these clusters (S550).

Next, the update judgment unit 330 determines whether or not cluster update information $h_2$ and $h_5$ cached in the cache unit 130 coincides with cluster update information $h_2$ and $h_5$ acquired from the data control system 10 (S555). If there is a mismatch for either of the cluster update information $h_2$ and $h_5$, the cache unit 130 makes a cached data element belonging to the corresponding cluster invalid.

On the other hand, if it does for each of the cluster update information $h_2$ and $h_5$ in S555, the group-of-clusters update information change unit 340 changes group-of-clusters update information $h_{2,5}$ for a group of clusters $\{C_3, C_4\}$ which belongs to the group of clusters $\{C_2, \ldots, C_5\}$ corresponding to the upper node, and which consists of clusters thereof other than the clusters $C_2$ and $C_5$.

The aforementioned information system 10 enables the data processing system 120, which duplicates and uses data elements on the database 110 in the data control system 100, to efficiently detect an update in data elements on the database 110.

Incidentally, it is preferable that the aforementioned hash function satisfy a generalized collision difficulty in order to enhance accuracy in the update detection. The generalized collision difficulty here means a feature in which, as for a number n of functions $H_1, \ldots, H_n$ having the same output message space M, it is difficult to find such a set $(x_1, \ldots, x_n)$ that satisfies $H_1(x_1)+H_2(x_2)+ \ldots +H_n(x_n)=0$ and that is also nontrivial. Assuming here that n=2 and $H_1=H_2$, this feature becomes a definition of collision difficulty of a normal hash function. When $H_1, \ldots, H_n$ are ideal hash functions, they satisfy the feature.

In this embodiment, by using hash functions H which satisfy a collision difficulty and by letting $H_i(x)=H(i\Box\Box x)$, cluster update information for each cluster can be updated by the hash functions which satisfy generalized collision difficulty. In a condition where cluster update information is updated in response to an update in data elements in a cluster, group-of-clusters update information for a group of clusters containing the cluster changes. The information system 10 can thereby detect an update in data elements at high accuracy.

The information system 10 according to this embodiment uses an exclusive OR as an operator "+" in an conditional expression $H_1(x_1)+H_2(x_2)+ \ldots +H_n(x_n)=0$ of the generalized collision difficulty. Furthermore, the information system 10 according to this embodiment utilizes that the hash function satisfies generalized collision difficulty and that an output message space of the hash functions forms an Abelian group against an exclusive OR operation for every bit. Therefore, with respect to the same group of clusters, the same group-of-clusters update information can be obtained irrespectively to an order of addition of cluster update information. Consequently, when a data element is not updated, group-of-clusters update information computed by the data processing system 120 based on group-of-clusters update information for a group of clusters corresponding to a lower node coincides with group-of-clusters update information computed with respect to the same group of clusters by the data control system 100 with a different operation order.

Instead of the exclusive OR operation, the information system 10 according to this embodiment may utilize a hash function or an operation as far as the function or the operation satisfies the aforementioned feature. For example, the hash function may be a power operation on an finite subgroup where a discrete logarithm problem is hard to solve. In this case, when a number n of elements $g_1, \ldots, g_n$ are selected in a subgroup G (where a unit element is I) of an order digit q, determination of $(x_1, \ldots, x_n)$ satisfying $g_1^{x1} g_2^{x2} \ldots g_n^{xn} = I$ is referred as an expression problem based on the discrete logarithm problem, which has a difficulty equivalent to that of the discrete logarithm problem. Here, the information system 10 may utilize a hash function $H(x)=g_i^x$ for a cluster $C_i$, and may replace the operator "+" with a multiplication on the subgroup G.

Alternatively, the information system 10 may update cluster update information by using an increment or decrement operation instead of a hash function. Namely, the cluster update information change unit 240 performs an increment or decrement operation on an original data value of cluster update information stored in the data control system 100 and changes it to the resultant value, provided that a data element in the group of clusters has been updated. Next, the group-of-clusters update information computation unit 260, on receipt of a referential request of cluster update information for the group of clusters, computes a sum for cluster update information for all of clusters belonging to the group of clusters, and assume the information to be group-of-clusters update information.

On the other hand, the group-of-clusters update information computation unit 320 in the data processing system 120 computes group-of-clusters update information for the same group of clusters, by summing cluster update information for all of clusters belonging to the group of clusters. Here, the group-of-clusters update information computation unit 320 may sum group-of-clusters update information for one of or a plurality of groups of clusters corresponding to lower nodes, and assume the resultant sum to be group-of-clusters update information corresponding to an upper node.

The information system 10, even when performing an increment or decrement operation to update cluster update information, can detect an update of a data element at high accuracy by using cluster update information and group-of-clusters update information which have a sufficient number of bits.

Figure 6:
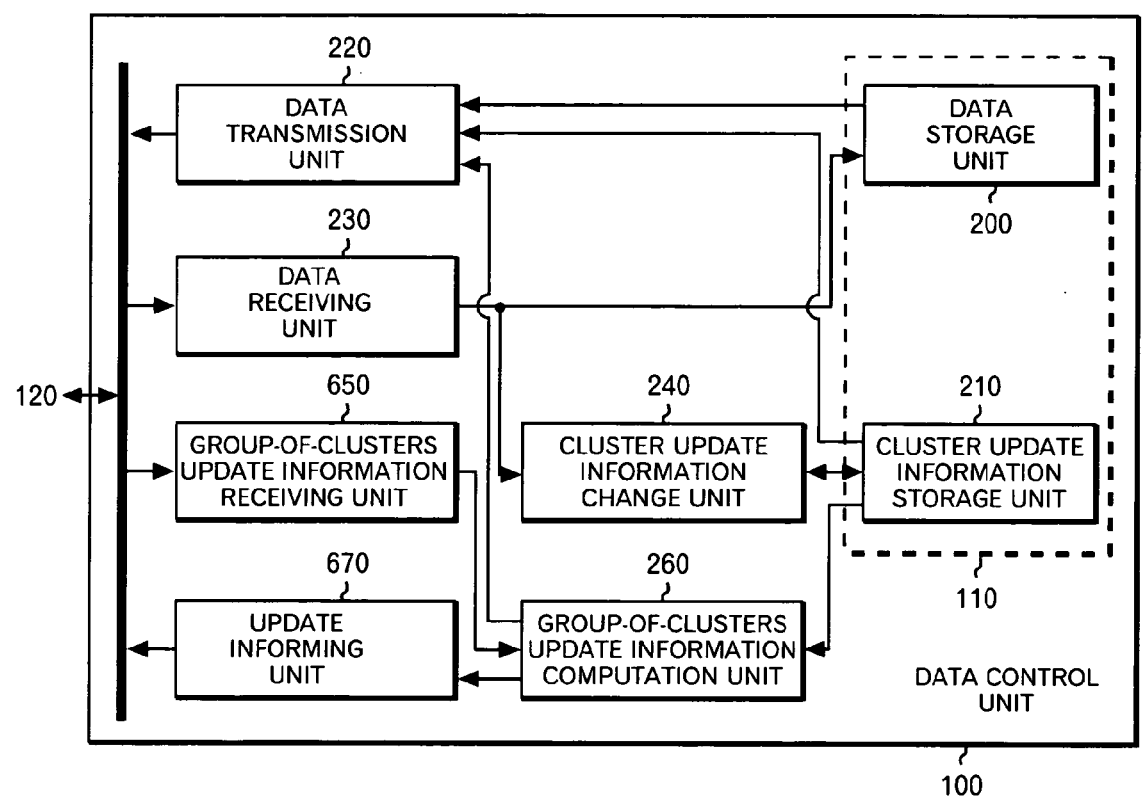
FIG. 6 shows a configuration of a data control system 100 according to a modified example of the embodiment of the present invention.

FIG. 6 shows a configuration of a data control system 100 according to a modified example of this embodiment. An information system 10 of the modified example transmits, from a data processing system 120 to a data control system 100, group-of-clusters update information computed based on cached cluster update information, and detects an update in the data control system 100. In FIG. 6, members having the same reference numerals as those in FIG. 2 assume almost the same functions and configurations as those in FIG. 2, and descriptions thereof are therefore omitted, although their differences with those in FIG. 2 will be described.

The data control system 100 according to the modified example includes a group-of-clusters update information receiving unit 650 and an update informing unit 670 instead of the referential request receiving unit 250 and an update information transmission unit 270. The group-of-clusters update information receiving unit 650 receives a check request containing group-of-clusters update information computed by the data processing system 120 based on cluster update information belonging to a group of clusters consisting of two or more clusters. The group-of-clusters update information computation unit 260 computes group-of-clusters update information, with respect to two or more clusters in a group of clusters designated by the test request, based on cluster update information stored in the cluster update information storage unit 210. In a condition where group-of-clusters update information computed by the group-of-clusters update information computation unit 260 coincides with group-of-clusters update information received from the data processing system 120, the update informing unit 670 informs to the data processing system 120 that a data element belonging to the group of clusters is the most updated, the data element having been cached in the data processing system 120. On the other hand, in a condition where they do not coincide with each other, the update informing unit 670 informs to the data processing system 120 that a data element of cluster belonging to the group of clusters is updated. In this case, the update informing unit 670 informs to the data processing system 120 group-of-clusters update information computed by the group-of-clusters update information computation unit 260.

Figure 7:
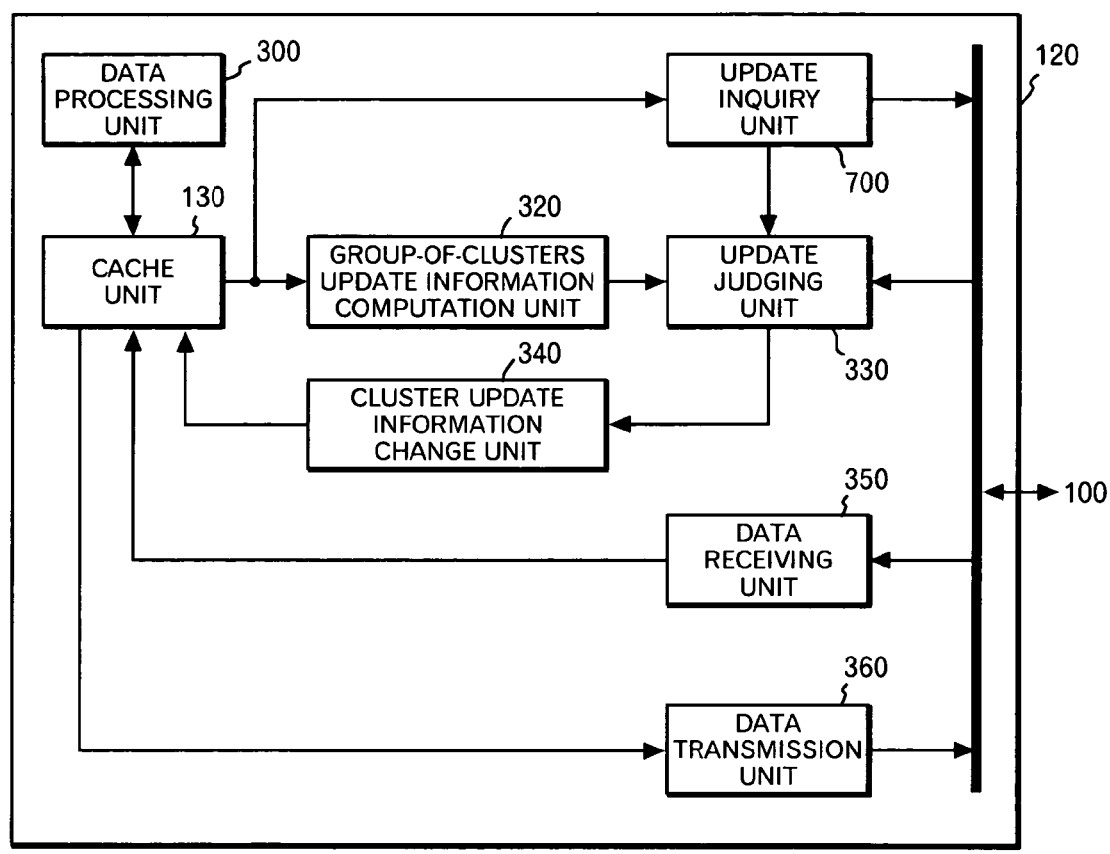
FIG. 7 shows a configuration of a data processing system 120 according to the modified example of the embodiment of the present invention.

FIG. 7 shows a configuration of a data processing system 120 according to the modified example of this embodiment. In FIG. 7, members having the same numbers as those in FIG. 3 assume almost the same functions and configurations as those in FIG. 3, and descriptions thereof are therefore omitted, although their differences with those in FIG. 3 will be described.

The data processing system 120 according to the modified example of this embodiment includes an update inquiry unit 700 instead of a group-of-update information acquisition unit 310. A group-of-clusters update information computation unit 320 computes, based on two or more pieces of cluster update information acquired with respect to a group of clusters consisting of two or more clusters to which two or more cached data elements belong, group-of-clusters update information for the group of clusters consisting of two or more clusters. An update inquiry unit 700 transmits to a data control system 100 a check request containing group-of-clusters update information computed by the group-of-clusters update information computation unit 320. Next, the update inquiry unit 700 inquires whether or not the computed information coincides with group-of-clusters update information determined based on two or more pieces of cluster update information stored with respect to two or more clusters in the data control system 100. Finally, on receipt of a response that the group-of-clusters update information computed by the group-of-clusters update information computation unit 320 coincides with the group-of-clusters update information based on cluster update information stored in the data control system 100, an update judgment unit 330 judges that cached data elements belonging to clusters within the group of clusters are the most updated.

Figure 8:
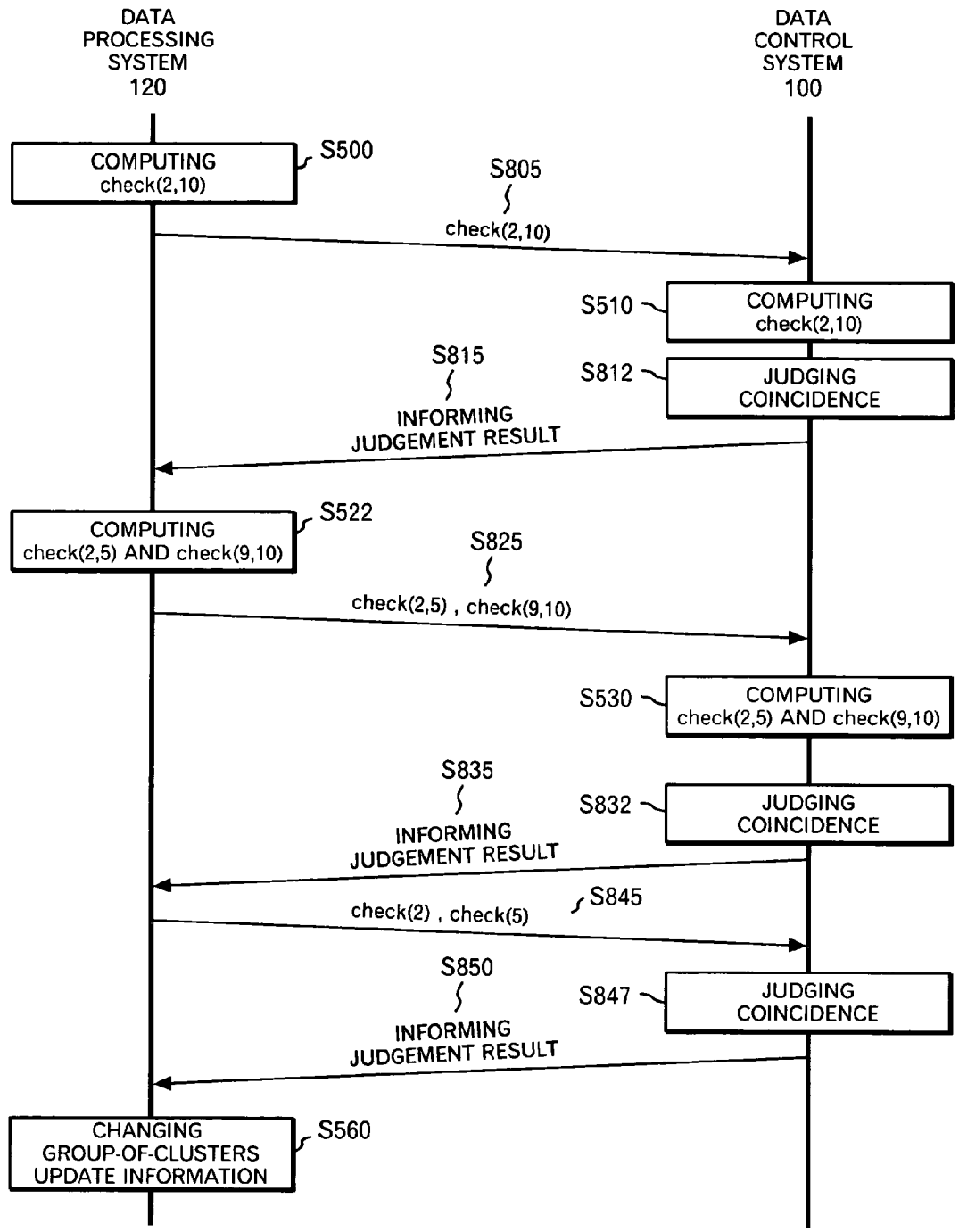
FIG. 8 shows a communication flow of an information system 10 according to the modified example of embodiment of the present invention.

FIG. 8 shows a communication flow of an information system 10 according to the modified example of this embodiment.

First, group-of-clusters update information check(2,10) is computed similarly to S500 in FIG. 5 (S500). Next, group-of-clusters update information acquisition unit 310 transmits to the data control system 100 a check request concerning group-of-clusters update information for the group of clusters (S805).

On receipt of the check request of group-of-clusters update information for the group of clusters $\{C_2, \ldots, C_{10}\}$, a group-of-clusters update information computation unit 260 in the data control system 100 computes group-of-clusters update information check(2,10) for the group of clusters (S510). Next, the group-of-clusters update information computation unit 260 determines whether or not the group-of-clusters update information computed by the data processing system 120 coincides with the group-of-clusters computed in S510 (S812), and informs the determination result to the data processing system 120 through a group-of-clusters update information receiving unit 650 (S815).

An update judgment unit 330, on receipt of information that they coincide with each other, judges that any cached data element in the group-of-clusters is the most updated, and allows a data processing unit 300 to continue processing data.

On the other hand, on receipt of information that they do not coincide with each other, a group-of-clusters update information computation unit 320 in the data processing system 120 computes group-of-clusters update information check(2, 5) and check(9,10) similarly to S522 in FIG. 5 (S522). Next, an update inquiry unit 700 transmits a check request concerning group-of-clusters update information for these groups of clusters to the data control system 100 (S825).

On receipt of the check request in S825, a group-of-clusters update information computation unit 260 in the data control system 100 computes group-of-clusters update information check(2,5) and check(9,10) for these groups of clusters (S530). Next, the group-of-clusters update information computation unit 260 determines whether or not the group-of-clusters update information computed by the data processing system 120 coincides with the group-of-clusters update information computed in S530 (S832). The group-of-clusters update information computation unit 260 informs the determination result to the data processing system 120 through group-of-clusters information receiving unit 650 (S835).

Next, on receipt of information that they coincide with each other, the update judgment unit 330 judges that any data element cached with respect to the groups of clusters is the most updated, and then updates group-of-clusters update information $h_{5,9}$ for the group of clusters $\{C_6, \ldots, C_8\}$ consisting of clusters which belongs to a group of clusters $\{C_2, \ldots, C_{10}\}$ corresponding to an upper node, and which belongs to neither of groups of clusters $\{C_2, \ldots, C_5\}$ and $\{C_9, \ldots, C_{10}\}$ corresponding to nodes lower than the foregoing group of clusters.

On the other hand, on receipt of information in S835 that they do not coincide with each other, the group-of-clusters update information acquisition unit 310 in the data processing system 120 transmits to the data control system 100 a check request of cluster (group-of-clusters) update information concerning clusters $C_2$ and $C_5$ further lower than the group of clusters $\{C_2, \ldots, C_5\}$ (S845). On receipt of the request, the group-of-clusters update information computation unit 260 in the data control system 100 determines whether or not cluster update information $h_2$ and $h_5$ of the clusters coincides with the cluster update information $h_2$ and $h_5$ stored in the cluster update information storage unit 210 (S847). The determination result is then transmitted to the data processing system 120 through group-of-clusters update information receiving unit 650 (S850).

Next, on receipt of information that they do not coincide with each other, the cache unit 130 makes a cached data element belonging to a cluster corresponding to the information invalid.

On the other hand, when it is informed for any cluster update information that they coincide with each other, a group-of-clusters update information change unit 340 changes group-of-clusters update information $h_{2,5}$ concerning a group of clusters $\{C_3, C_4\}$ which belongs to the group of clusters $\{C_2, \ldots, C_5\}$ corresponding to an upper node and which consists of clusters other than the clusters $C_2$ and $C_5$, based on the most updated value of cluster update information which has been received along with the information that they do not coincide with each other.

According to the aforementioned information system 10, similarly to the information system 10 shown in FIGS. 2 and 3, the data processing system 120 duplicating and using data elements on the database 110 in the data control system 100 can efficiently detect an update of the data elements on the database 110.

Figure 9:
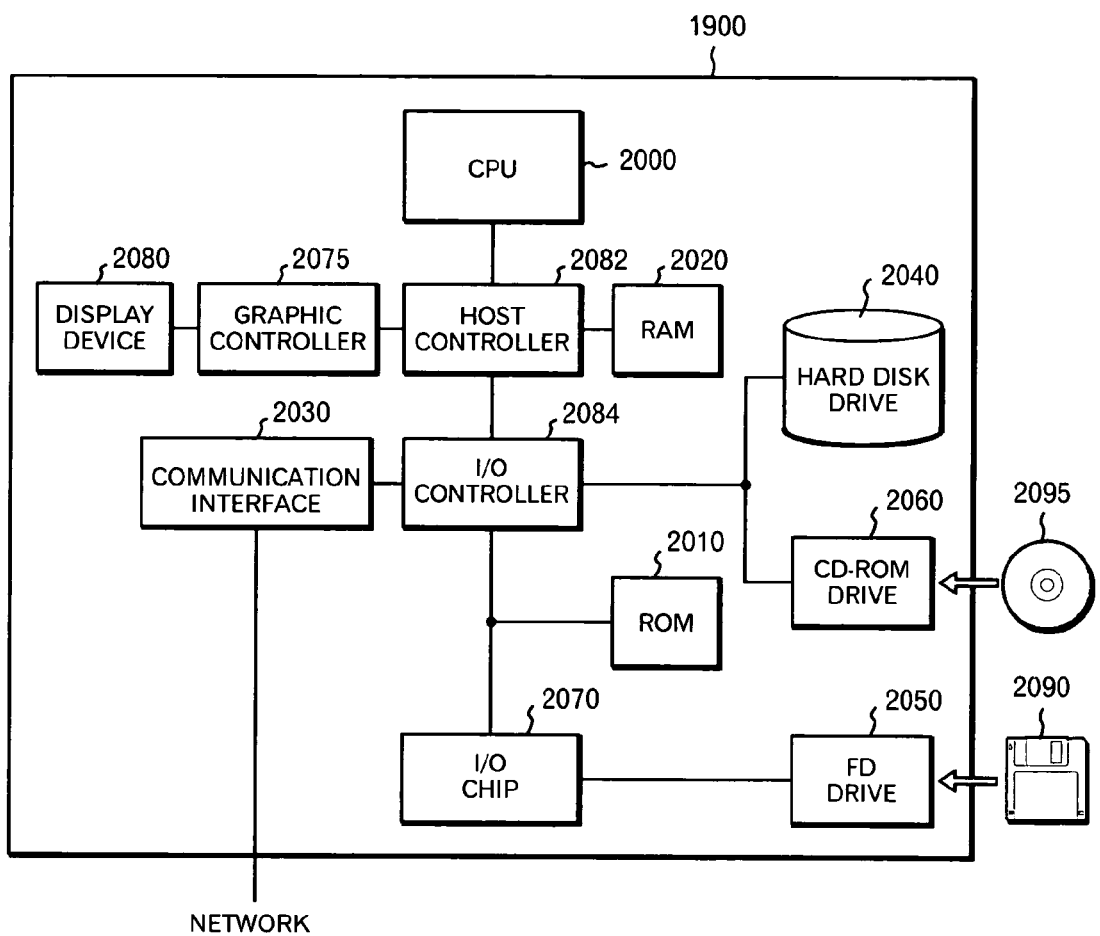
FIG. 9 shows an example of a hardware configuration of a computer 1900 according to the embodiment of the present invention.

FIG. 9 shows an example of a hardware configuration of computer 1900 according to this embodiment. The computer 1900 according to this embodiment are provided with: a CPU peripheral unit including a CPU 2000, a RAM 2020, a graphic controller 2075, and a display device 2080 all of which are interconnected via a host controller 2082; a I/O unit including a communication interface 2030 connected to the host controller 2082 via the I/O controller 2084, a hard disk drive 2040, and a CD-ROM drive 2060; and a legacy I/O unit containing a ROM 2010 connected to the host controller 2084, a flexible disc drive 2050, and an I/O chip 2070.

The host controller 2082 connects the RAM 2020 with the CPU 2000 accessing to the RAM 2020 at a high transfer rate, and with the graphic controller 2075. The CPU 2000 operates based on programs stored in the ROM 2010 and the RAM 2020 to control each unit. The graphic controller 2075 acquires image data generated by the CPU 2000 and the like on a frame buffer provided in the RAM 2020, and allows the display device 2080 to display. Alternatively, the graphic controller 2075 may include in itself a frame buffer to store image data generated by the CPU 2000 and the like.

The I/O controller 2084 connects the host controller 2082 with the communication interface 2030 as a comparatively high speed I/O device, the hard disc drive 2040, and the CD-ROM drive 2060. The communication interface 2030 communicates with other devices through network. The hard disc drive 2040 stores programs and data used by the CPU 2000 in the computer 1900. The CD-ROM drive 2060 reads out programs or data from the CD-ROM 2095, and provides them to the hard disc drive 2040 through the RAM 2020.

Furthermore, with the I/O controller 2084, the ROM 2010, the flexible disc drive 2050, and the I/O chip 2070 as a comparatively low speed I/O device are connected. The ROM 2010 stores boot programs to be executed by the computer 1900 at the time of activation, programs depending on hardware of the computer 1900, and the like. The flexible disc drive 2050 reads out programs or data from the flexible disc 2090, and provides them to the hard disc drive 2040 through the RAM 2020. The I/O chip 2070 connects various kinds of I/O devices with one another through the flexible disc drive 2050, a parallel port, a serial port, a keyboard port, a mouse port, and the like.

Programs to be provided to the hard disc drive 2040 through the RAM 2020 are provided by users while being stored in recording media such as the flexible disc 2090, the CD-ROM 2095, IC card, and the like. The programs are read out from the recording media, are installed in the hard disc drive 2040 in the computer 1900 through the RAM 2020, and are executed in the CPU 2000.

Data control programs installed in the computer 1900, which allow the computer 1900 to function as the data control system 100 shown in FIG. 2, include: a data control module controlling the data storage unit 200; cluster update information control module controlling the cluster update information storage unit 210; a data transmission module; a data receiving module; a cluster update information change module; a referential request receiving module; a group-of-clusters update information computation module; and update information transmission module. These programs or modules cause the CPU 2000 and the like to make the computer 1900 to function respectively as the data storage unit 200, cluster update information storage unit 210, the data transmission unit 250, the data receiving unit 230, cluster update information change unit 240, the referential request receiving unit 250, the group-of-clusters update information computation unit 260, and the update information transmission unit 270.

Data processing programs installed in the computer 1900, which allow the computer 1900 to function as the data control system 100 shown in FIG. 3, include: a data processing module; a cache control module; a group-of-clusters update information module; a group-of-clusters update information computation module; an update judgment module; a group-of-clusters update information change module; a data receiving module; and a data transmission module. These programs or modules cause the CPU 2000 and the like to make the computer 1900 to function respectively as the data processing unit 300, the cache unit 130, the group-of-clusters update information acquisition unit 310, the group-of-clusters update information computation unit 320, the update judgment unit 330, the group-of-clusters update information change unit 340, the data receiving unit 350, and the data transmission unit 360.

Additionally, data control programs installed in the computer 1900, which allow the computer 1900 to function as the data control system 100 shown in FIG. 6, include: a data control module controlling the data storage unit 200; a cluster update information control module controlling the cluster update information storage unit 210; a data transmission module; a data receiving module; cluster update information change module; group-of-clusters update information receiving module; a group-of-clusters update information computation module; and an update informing module. These programs or modules cause the CPU 2000 and the like to make the computer 1900 to function respectively as the data storage unit 200, cluster update information storage unit 210, the data transmission unit 220, the data receiving unit 230, the cluster update information change unit 240, the group-of-clusters update information receiving unit 650, the group-of-clusters update information computation unit 260, and the update informing unit 670.

Data processing programs installed in the computer 1900, which allow the computer 1900 to function as the data processing system 120 shown in FIG. 7 include: a data processing module; a cache control module; an update inquiry module; a group-of-clusters update information computation module; an update judging module; a group-of-clusters update information change module; a data receiving module; and a data transmission module. These programs and the modules cause the CPU 2000 and the like to make the computer 1900 to function respectively as the data processing unit 300, the cache unit 130, the update inquiry unit 700, the group-of-clusters update information computation unit 320, the update judgment unit 330, the group-of-clusters update information change unit 340, the data receiving unit 350, and the data transmission unit 360.

The aforementioned programs or modules may be stored in external storage media. As the storage media, optical recording media such as DVD and CD, magneto-optic recording media such as MO, tape media, semiconductor memories such as an IC cards, and the like can be used as well as the flexible disc 2090 and the CD-ROM 2095. Additionally, storage devices such as hard discs, RAM, and the like contained in a server system connected to a private communication network and the Internet may be used as recording media to provide the programs to the computer 1900 through the network.

According to the aforementioned information system 10, the data processing system 120 duplicating and using the data elements on the database 110 in the data control system 100 can efficiently detect an update of the data elements on the database 110 with a small amount of communications. More specifically, the amounts of communications and of calculations in the information system 10 according to this embodiment and those in the conventional method can be calculated as follows, when: the amount of data for cluster update information and group-of-clusters update information is denoted by m; the amount of data for update information used for update detection of normal data elements in conventional methods is denoted by m'; the total number of clusters is denoted by t; the number of data elements to be cached is denoted by k; the number of all of clusters having the cached data elements belonged is denoted by l; and the number of clusters having updated data elements is denoted by $\alpha$.

(1) The Amounts of Communications and of Calculations in the Information System 10 According to this Embodiment:

Since the information system 10 according to this embodiment searches updated clusters through a tree structure, the number of communication in the data control system 100 and the data processing system 120 becomes $\log_2 l$. Additionally, the amount $2 m \log_2 l$ of communications is also required to specify updated clusters. Furthermore, in a case of a Direct Checking manner which performs update checks for all of data elements belonging to the specified clusters, one communication is conducted to receive updated information, and m'k/l of data is transferred on average.

Therefore, in the information system 10 of this embodiment, the total amount of communications will be $\alpha$ ($2 m \log_2 l$+m'k/l). When k is sufficiently large, the total amount of communications is exponentially reduced against an increase in the number of communications.

The amount of calculations will be a verification for exclusive OR operations on $3t\alpha$ pieces of cluster update information and $k\alpha/l$ pieces of cluster update information by the data control system 100.

(2) The Amount of Communications in Conventional Methods:

When the Direct Checking manner is applied to check updates for all of data elements, the number of communications is one, and the amount of communications becomes km'. The amount of calculations will be a verification for k pieces of cluster update information.

Hereinbefore, the present invention has been described by way of embodiment. However, the technical scope of the present invention is not restricted to the aforementioned embodiment. It is apparent to those skilled in the art that various kinds of changes and improvements may be added to the aforementioned embodiment. It is clear from the description of the appended claims that embodiments added with the changes and improvements can also be included in the technical scope of the invention.

For example, the data control system 100 may select, based on a frequency in update of a data element, a cluster to which a data element should belong. Namely, for example, the data control system 100 intensively allocates frequently updated data elements to a small number of clusters, and thereby it is possible to efficiently search in the tree structure graph shown in FIG. 4.

In an example of the cluster selection, in controlling product information based on an application such as EPC-IS, the data control system 100 may allocate attribute data which are basically not to be updated, such as product names and manufacturing dates, to some clusters, and allocate attributes which are highly likely to be frequently updated, such as product locations, to other clusters. Furthermore, the data control system 100 may allocate database lines storing information for a product sequentially in response to requests, and continuous database lines may be allocated to the same cluster. Thereby, data elements for relatively old and rarely updated products and those for relatively new and frequently updated products can be allocated to different clusters.

Alternatively, the data control system 100 may measure a update frequency for each attribute or for each line of database to re-allocate data elements to clusters based on the measurement results.

Additionally, the information system 10 may be used as an information system including a plurality of information processing systems each of which processes and outputs log information. In the information system, the log information may be stored as the data storage unit 200, and changes in the log information may be detected by the data processing system 120. This log information is seldom updated and normally only read out, and accordingly, that is efficiently processed by the information system 10 according to the embodiment of the present invention. Examples of the system include audit in security control of information system and monitoring in sensed results of a sensor network.

The present invention makes it possible for a data processing system, which duplicates data on a database and uses it, to efficiently detect an update of the database.

Although advantageous embodiments of the present invention has been described in detail, it should be understood that various changes, substitutions and alternations can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system, or in a distributed fashion where different elements are spread across-several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A data processing system comprising:
a processor device used for acquiring a group-of-clusters update information from a data control system, in response to an update check request, cluster update information which is computed by the data control system based on two or more pieces of the cluster update information stored in the data control system:
a cache device for caching the cluster update information, wherein the cache unit comprises:
 a list of data elements to be duplicated, said data elements belonging to a single cluster of a plurality of clusters, wherein any same data element is made to belong to a same cluster;
 identifiers of the clusters to which the data elements belong; and
 the cluster update information received from the data control system, of which data value of the data elements to be duplicated has been updated, wherein said cluster update information is used as an update checksum indicating that the data element belonging to one of the plurality of clusters is updated;
a group-of-clusters update information computation unit to compute group-of-clusters update information with respect to the group of clusters based on the two or more pieces of cluster update information having been cached, wherein said computation unit performs a hash function on the cluster update information for all of the clusters belonging to the group of clusters for every corresponding bit and then performs exclusive OR operations on results of the hash function; and
wherein a cluster update information storage unit applies an initial value of cluster update information by using a predetermined hash function and the hash function which satisfies a collision difficulty in order to enhance accuracy in update detection;
an update judging unit device to judge that the value obtained through the exclusive OR operation is a most recently updated group-of-clusters update information for the group of clusters, provided that the group-of-clusters update information coincides with the cluster update information acquired from the data control system, such that the data processing system is able to determine whether a cached data item is the most recently updated; and a data transmission device that transmits to the data control system group-of-clusters update information for updating the cluster update information for all of the clusters to which the cached data elements belong in the database such that the update information is duplicated across the data processing system, and such that the data control system does not need to perform a cache control on the data elements and clusters cached by the data processing system.

2. The data processing system according to claim 1, wherein, in a condition where first group-of-clusters update information computed by the group-of-clusters update information computation unit with respect to a first group of clusters of the aforementioned groups of clusters consisting of a first number of the clusters does not coincide with first group-of-clusters update information acquired from the data control system with respect to the first group of clusters:

the group-of-clusters update information acquisition unit acquires, from the data control system, with respect to a second group of clusters belonging to the first group of clusters and consisting of a second number of the clusters, second group-of-clusters update information based on cluster update information for the second number of the clusters belonging to the second group of clusters, the second number being smaller than that of the first group-of-clusters, the group-of-clusters update information computation unit computes the second group-of-clusters update information for the second group-of-clusters, based on the second number of the cached cluster update information, and the update judgment unit, in a condition where the second group-of-clusters update information computed by the group-of-clusters update information computation unit coincides with the second group-of-clusters update information acquired from the data control system, judges that the cached data elements belonging to the clusters in the second group of clusters are the most updated.

3. The data processing system according to claim 2, wherein, in a condition where the second group-of-clusters update information computed by the group-of-clusters update information computation unit does not coincide with the second group-of-clusters update information acquired by the data control system, the group-of-clusters update information acquisition unit acquires, from the data control system, with respect to a third group of the clusters belonging to the second group of the clusters and consisting of a third number of the clusters, third group-of-clusters update information based on the cluster update information for the third number of the clusters belonging to the third group of clusters, the third number being smaller than that of the second group of clusters, the group-of-clusters update information computation unit computes the third group-of-clusters update information for the third group of the clusters, based on the third number of the cached cluster update information, and the update judgment unit, in a condition where the third group-of-clusters update information computed by the group-of-clusters update information computation unit coincides with the third group-of-clusters update information acquired from the data control system, judges that the cached data elements belonging to the clusters in the third group of clusters are the most updated.

4. The data processing system according to claim 2, wherein the group-of-clusters update information acquisition unit acquires, from the data control system, with respect to a fourth group of clusters consisting of a fourth number of the clusters belonging to the first group of clusters and not belonging to the second group of clusters, fourth group-of-clusters update information based on the cluster update information for the fourth number of the clusters belonging to the fourth group of clusters, the group-of-clusters update information computation unit computes the fourth group-of-clusters update information with respect to the fourth group of clusters, based on the fourth number of the cached cluster update information, and the update judgment unit, in a condition where the fourth group-of-clusters update information computed by the group-of-clusters update information computation unit accords with the fourth group-of-clusters update information acquired by the data control system, judges that the cached data elements belonging to the clusters within the fourth group-of-clusters are the most updated.

5. The data processing system according to claim 4, wherein the cache unit caches, with respect to a fifth group of clusters which consists of all of the clusters belonging to the first group of clusters and belonging to neither of the second group of clusters nor the fourth group of clusters and which does not include any of the cached data elements belonging to any of the clusters therein, fifth group-of-clusters update information based on the cluster update information for all of the clusters belonging to the fifth group of clusters, and the group-of-clusters update information computation unit computes the first group-of-clusters update information, based on the second group-of-clusters update information, the fifth group-of-clusters update information, and the fourth group-of-clusters update information.

6. The data processing unit according to claim 5, wherein the cache unit, in a case where the data elements of only a first cluster and a second cluster of the clusters are cached with respect to the second group of clusters, caches first cluster update information for the first clusters, second cluster update information for the second clusters, and sixth information of the group-of-clusters update information based on the cluster update information for all of the clusters other than the first and second clusters in the second group-of-clusters, as the group-of-clusters update information, and the group-of-clusters update information computation unit computes the second group-of-clusters update information, based on the first cluster update information, the second cluster update information, and the sixth group-of-clusters update information.

7. The data processing system according to claim 6, further comprising:

a group-of-clusters update information change unit which, in a condition where the second group-of-clusters update information and the fourth group-of-clusters update information computed by the group-of-clusters update information computation unit coincides with the second group-of-clusters update information and the fourth group-of-clusters update information acquired from the data control system respectively in a condition where the first group-of-clusters update information computed by the group-of-clusters update information computation unit does not coincide with the first group-of-clusters update information acquired from the data control system, changes the fifth group-of-clusters update information, based on the first group-of-clusters update information, the second group-of-clusters update information, and the fourth group-of-clusters update information all of which have been acquired from the data control system.

8. The data processing system according to claim 5, wherein the cluster update information stored in the data control system is obtained by converting an original data value through a hash function provided that the data element belonging to the cluster has been updated, and the group-of-clusters update information computation unit computes the first group-of-clusters update information by performing exclusive OR operations respectively of bits corresponding to the second group-of-clusters update information, the fourth group-of-clusters update information, and the fifth group-of-clusters update information all of which are data values obtained by performing exclusive OR operations respectively of bits corresponding to the cluster update information for all of the clusters belonging to the respective groups of clusters with respect to the second group of clusters, the fourth group of clusters and the fifth group of clusters.

9. The data processing system according to claim 5, wherein the cluster update information stored in the data control system is changed into a data value obtained by performing an increment or decrement operation on an original data value, provided that the data element belonging to the cluster has been updated, and the group-of-clusters update information computation unit computes the first group-of-clusters update information by summing the second group-of-clusters update information, the fourth group-of-clusters update information, and the fifth group-of-clusters update information all of which are data values obtained by summing the cluster update information for all of the clusters belonging to the respective groups of clusters with respect to the second group of clusters, the fourth group of clusters and the fifth group of clusters.

10. The data processing system according to claim 5, wherein each of the clusters is allocated with a cluster number, the group of clusters consists of one cluster or two or more clusters whose cluster numbers are continuous, and in each of the first group of clusters, the second group of clusters, and the fourth group of clusters, at least one data element is cached among data elements belonging to a cluster therein allocated with the minimum cluster number, and at least one data element is cached among data elements belonging to a cluster therein allocated with the maximum cluster number.

11. A data control system comprising:
a data storage device to categorize a plurality of data elements into a plurality of clusters and storing the plurality of clusters, wherein any same data element is made to belong to a same cluster;
a cluster update information storage unit to store cluster update information indicative of an update state of a data element of each of the plurality of clusters in such a way that the cluster update information is associated with the each of the plurality of clusters, wherein the clusters update information storage unit applies an initial value of cluster update information by using a predetermined hash function;
a cluster update information change unit to change, to a different one, a data value in the cluster update information for the cluster to which the data element belongs, provided that the data element has been updated;

a data transmission unit to transmit to a data processing system the data element and the cluster update information for the cluster to which the data element belongs in response to a request from the data processing system to acquire the data element and performing a data processing on the data element;
a group-of-clusters update information computation unit for, in a condition where from the data processing system a referential request for the cluster update information with respect to a group of clusters consisting of two or more of the clusters is received, computing group-of-clusters update information based on the cluster update information for the two or more clusters belonging to the group of clusters, wherein said computing step comprises performing a hash function on the cluster update information in order to enhance accuracy in update detection, followed by exclusive OR operations on results of hash functions on the cluster update information for all of the clusters belonging to the group of clusters for every corresponding bit thereto; and
an update information transmission unit to transmit the group-of-clusters update information to the data processing system.

12. An information system, comprising:
a processor device used as a data control system to categorize a plurality of data elements into a plurality of clusters and storing the plurality of clusters; and
a data processing system to acquire data from the data control system and performing a data processing on the data, wherein the data control system comprises:
  a data storage unit to categorize a plurality of data elements into a plurality of clusters and storing the plurality of clusters;
  a cluster update information storage unit to store cluster update information indicative of an update state of a data element of each of the plurality of clusters in such a way that the cluster update information is associated with the each of the plurality of clusters;
  a cluster update information change unit to change, to a different one, a data value in the cluster update information for the cluster to which the data element belongs, provided that the data element has been updated;
  a data transmission unit to transmit to the data processing system the data element and the cluster update information for the cluster to which the data element belongs in response to a request from the data processing system;
  a group-of-clusters update information receiving unit to receive group-of-clusters update information which is computed by the data processing system based on the cluster update information with respect to a group of clusters consisting of two or more of the clusters, the cluster update information belonging to the group of clusters, wherein the group-of-clusters update information computation unit applies an initial value of cluster update information by using a predetermined hash function in order to enhance accuracy in update detection;
  a first group-of-clusters update information computation unit to compute the group-of-clusters update information based on the cluster update information stored in the cluster update information storage unit with respect to the two or more clusters; and
  an update informing unit for informing the data processing system that said data element in said cluster belonging to the group of clusters is the most updated one, the data element having been cached in the data processing system, in a condition where the group-of-clusters update information which is computed by the first group-of-clusters update information computation unit coincides with the group-of-clusters update information which is transmitted from the data processing system; and the data processing system comprises:

a cache unit to acquire from the data control system a data element belonging to a single cluster of the plurality of clusters, and the cluster update information for the single cluster;

a second group-of-clusters update information computation unit to compute group-of-clusters update information with respect to a group of clusters based on two or more pieces of the cluster update information acquired pertaining to two or more of the clusters containing two or more of the data elements having been cached, the group of clusters consisting of the two or more clusters, wherein said computation unit performs hash functions followed by exclusive OR operations on results of the hash function on the cluster update information for all of the clusters belonging to the group of clusters for every corresponding bit thereto;

an update inquiry unit to transmit to the data control system the group-of-clusters update information which is computed by the second group-of-clusters update information computation unit, and to inquire whether or not the group-of-clusters update information thus transmitted coincides with the group-of-clusters update information which is set based on two or more of the cluster update information stored in the data control system with respect to the two or more clusters; and an update judging unit to judge that said data element thus cached belonging to said cluster of the group of the clusters is the most updated one, in a condition where a response is received that the group-of-clusters update information which is computed by the second group-of-clusters update information computation unit coincides with the group-of-clusters update information which is based on the cluster update information stored in the data control system.

13. A data processing program embodied on a physical computer readable storage medium, said data processing program comprising program code that enables a computer to perform steps of:

acquiring a list of data elements to be duplicated, wherein each of the data elements have been allocated in advance to a single cluster of a plurality of clusters, wherein any same data element is made to belong to a same cluster;

acquiring identifiers of the clusters to which the listed data elements belong, acquiring a list of identifiers of the clusters, and acquiring cluster update information of which data value of the data elements to be duplicated has been updated, wherein said cluster update information is used as an update checksum indicating that the data element belonging to one of the plurality of clusters is updated, and wherein said cluster update information is acquired from a data control system in response to a request;

acquiring cluster update information from the data control system based on two or more pieces of the cluster update information stored in the data control system with respect to two or more of the clusters containing two or more of the data elements having been cached, the update information pertaining to a group of clusters consisting of the two or more clusters; and computing the group-of-clusters update information with respect to the group of clusters based on the two or more pieces of cluster update information having been cached, wherein said computing step comprises applying an initial value of cluster update information by using a predetermined hash function, in order to enhance accuracy in update detection, followed by performing exclusive OR operations on results of the hash functions on the cluster update information for all of the clusters belonging to the group of clusters for every corresponding bit;

determining that a value obtained through the exclusive OR operation is a most recently updated group-of-clusters update information for the group of clusters by comparing it to the cached cluster update information; and transmitting to the data control system the group-of-clusters update information for updating the cluster update information for all of the clusters to which the cached data elements belong such that the data control system does not need to perform a cache control on the data elements and clusters cached by the data processing system.

14. A data control program embodied on a physical computer readable storage medium, said control program comprising program code that enables a computer to perform steps of:

categorizing a plurality of data elements into a plurality of clusters and storing the plurality of clusters;

storing cluster update information indicative of an update state of a data element of each of the plurality of clusters in such a way that the cluster update information is associated with the each of the plurality of clusters;

changing, to a different one, a data value in the cluster update information for the cluster to which the data element belongs, provided that the data element has been updated;

transmitting to a data processing system the data element and the cluster update information for the cluster to which the data element belongs in response to a request from the data processing system to acquire the data element and performing a data processing on the data element;

in a condition where a referential request for the cluster update information with respect to a group of clusters comprising two or more of the clusters is received from the data processing system, computing group-of-clusters update information based on the cluster update information for the two or more clusters belonging to the group of clusters, wherein said computing step comprises applying an initial value of cluster update information by using a predetermined hash function in order to enhance accuracy in update detection, then performing exclusive OR operations on results of the hash functions performed on the cluster update information for all of the clusters belonging to the group of clusters for every corresponding bit; and transmitting the group-of-clusters update information to the data processing system.

15. A data processing method comprising:

using a central processing unit for:

acquiring from a data control system in response to an update check request:

a list of data elements to be duplicated, wherein each of the data elements has been allocated in advance to a cluster of a plurality of clusters, wherein any same data element is made to belong to a same cluster;

using a storage device for storing identifiers of the clusters to which the listed data elements belong; and cluster update information of which data value of the data elements to be duplicated has been updated, wherein said cluster update information is used as an update checksum indicating that the data element belonging to one of the plurality of clusters is updated;

using a cache for caching the listed data elements and the cluster update information thus acquired;

using the central processing unit for: computing a group-of-clusters update information with respect to the group of clusters based on the two or more pieces of cluster update information having been cached, wherein said computing step comprises applying an initial value of cluster update information by using a predetermined hash function in order to enhance accuracy in update detection, then performing exclusive OR operations on results of the hash functions performed on the cluster update information for all of the clusters belonging to the group of clusters for every corresponding bit;

determining that the value obtained through the exclusive OR operation is a most recently updated group-of-clusters update information for the group of clusters provided that the group-of-clusters update information coincides with the cluster update information acquired from the data control system, such that the data processing system is able to determine whether a cached data item is the most recently updated; and transmitting the group-of-clusters update information to the data control system, for updating the data element such that the cluster update information is duplicated across all data processing systems, wherein the data control system does not need to perform a cache control on the data elements and clusters cached by the data processing systems.

* * * * *